United States Patent
Tönnby et al.

(10) Patent No.: US 6,738,981 B1
(45) Date of Patent: May 18, 2004

(54) GENERAL ACCESS SYSTEM

(75) Inventors: Ingmar Tönnby, Stockholm (SE); Allan Hansson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/979,619

(22) Filed: Nov. 28, 1997

(30) Foreign Application Priority Data

Nov. 29, 1996 (SE) .............................................. 9604409

(51) Int. Cl.[7] .............................................. H04N 1/173
(52) U.S. Cl. ........................... 725/98; 725/118; 725/82; 725/99; 709/217; 370/395.5; 370/466
(58) Field of Search .................... 348/12; 709/217–219, 709/201–202; 370/229, 339, 390, 395.5–395.53, 466; 725/82, 98–100, 106, 109–123, 143–150

(56) References Cited

U.S. PATENT DOCUMENTS

| | | | | |
|---|---|---|---|---|
| 4,755,992 A | * | 7/1988 | Albal | 370/94 |
| 5,557,320 A | * | 9/1996 | Krebs | 725/114 |
| 5,561,709 A | * | 10/1996 | Remillard | 379/96 |
| 5,570,359 A | * | 10/1996 | Nguyen | 370/60 |
| 5,574,964 A | * | 11/1996 | Hamlin | 725/78 |
| 5,592,477 A | * | 1/1997 | Farris et al. | 370/396 |
| 5,600,643 A | * | 2/1997 | Robrock | 370/339 |
| 5,629,978 A | * | 5/1997 | Blumhardt et al. | 379/201 |
| 5,790,553 A | * | 8/1998 | Deatone et al. | 370/466 |
| 6,101,182 A | * | 8/2000 | Sistanizadeh et al. | 370/352 |
| 6,173,326 B1 | * | 1/2001 | Collins | 709/229 |
| 6,188,397 B1 | * | 2/2001 | Humpleman | 345/327 |
| 6,288,738 B1 | * | 9/2001 | Dureau et al. | 725/109 |
| 6,305,020 B1 | * | 10/2001 | Hoarty et al. | 725/95 |

FOREIGN PATENT DOCUMENTS

| | | |
|---|---|---|
| WO | WO96/34504 | 10/1996 |
| WO | WO97/46073 | 12/1997 |
| WO | WO97/47119 | 12/1997 |
| WO | WO97/47127 | 12/1997 |

* cited by examiner

*Primary Examiner*—Vivek Srivastava
*Assistant Examiner*—Reuben M. Brown

(57) ABSTRACT

The present invention discloses a general access system for access to communication services, such as telecommunication, data communication and distribution of TV and radio. The access system comprises a connectivity network, a number of access adapters connected to the communication network, a number of service providing networks, each connected to access adapters, a number of network terminals connected to the connectivity network and to a number of terminals. Service access points of the service providing networks are distributed to all the network terminals which belongs to subscribers of that particular service. Applications in the network terminals enhance and/or combines the services from different service providing networks and offers them to users via the terminals.

50 Claims, 13 Drawing Sheets

GENERAL ACCESS SYSTEM

FIELD OF THE INVENTION

The present invention relates to telecommunication networks, data communication networks and broadcasting networks in general, and to access networks in particular.

An access network may in broad terms be defined as the means by which services of a network are made available to a terminal which is connected to the access network. The access system in its turn is connected to service provided network. In PSTN, for example, the access system comprises the network formed by the subscriber lines and equipment connected at each end of the individual subscriber lines; such as telephones at the subscriber side and terminal units at the local office side.

In this document an access system is defined as the means by which the services of an entity are made available to another entity at a certain point, the service access point (SAP) and enabling users to exploit the services. In this paper, an access system is an arrangement, separate from the accessed entities, which makes the services of one or several communication networks, and/or of one or several broadcasting networks, exploitable to a set of users. Thus, an access system provides a set of service access points to a number of different service providing networks.

Access systems are used to distribute the service access points of a set of service providing networks to locations, which are suitable for the users of the services of the networks.

STATE OF THE ART

Dedicated Accesses

Traditionally, telecommunication services have been provided by vertically integrated networks. The designers of the network and its components and protocols have used the knowledge of which services it would provide, and of the contexts, in which these services were to be provided. E.g., a PSTN is designed to provide point to point two-way connections, aimed to support 3.1 kHz speech. The networks were not designed for other services and contexts. This results in network components that fit together like pieces of a jigsaw puzzle. Such pieces are hard to reuse for other purposes, or for a new contexts.

Also the access arrangements are integrated in the same way. E.g., the access network of PSTN is simply seen as an extension of the PSTN. It is assumed that each terminal is connected over a dedicated pair of copper wires, and at least some of the control signaling is performed by opening and/or closing the loop. There is no need to have a separate address domain in the access network, since each service access point has its own dedicated copper line.

The integration of access arrangement and network goes so far that it is possible to classify vertically integrated networks by their access type; that is access protocoll, kind of terminal used for the access and services provided by the service providing network. Sometimes the terminal itself makes it possible to identify the service network. A telex apparatus for example is dedicated to the telex service of the telex network. Likewise a telephone set is dedicated to a telephony network; it cannot be used in any other type of network. An mobile telephone set gives access to the mobile telephony service, it cannot be used in the PSTN because its access protocol is different from the PSTN access protocols.

Besides the analogue access to PSTN, there are e.g. X.25 and X.21, which are dedicated access protocols interfacing specialized networks.

The recent development of access networks to PSTN and ISDN, e.g. the V5 standards, follows the same line. The access arrangement is dedicated for the services of PSTN and ISDN. It is also assumed that the owner of the access network is the same as the owner of the accessed network. The possibility to access more than one network of the same kind, but with different ownership, seems not to be covered.

If we look at mobile telephone networks, there are a number of different analogue and digital access types. Dedicated terminals are required for each type of network and are incompatible with other networks. The different networks provides basically the same type of service. From the above it is obvious, that an access is dedicated to a combination of network and service, not to a service only.

Integrated Services Networks

For a long time, new techniques have been developed in order to increase the transmission capabilities of traditional access infrastructure. An example of this is DSL (Digital Subscriber Line), which is the transmission protocol for ISDN access, which provides a 144 kb/s transmission link over a traditional copper subscriber line. Other modulation techniques, xDSL, are already specified, or are under specification, which gives symmetrical or asymmetrical rates up to several Mb/s over a copper wire.

During the last couple of decades, a number of network concepts have been proposed like ISDN and B-ISDN. They aim to provide a number of services, which traditionally have been provided by different networks, by a single network with its own address domain.

Also in these cases, a dedicated access approach is taken. E.g., for ISDN (Integrated Services Digital Network), services like telephony, which were accessed in one way when they were provided by the legacy networks, are accessed in a quite different way over the integrated ISDN access. The way a user accesses the services of these networks is still dedicated, but the range of services is wider, and it is easier to add new services. We call this type of access to an integrated service network an integrated access. In ISDN Network Terminals (NT) are used, which connects to a number of terminals. Simple NTs just conveys the access protocols to the terminals, but more complicated NTs exists, e.g. with a functionality like a traditional Private Branch Exchange (PABX).

The integrated networks were defined as a single, homogeneous network with its own, specific interfaces, even towards the terminals. When new services are required, new capabilities have to be integrated in the integrated networks. New services are traditionally added following the three step method. In the first step the new service is described in an implementation independent manner. In the second step the units required to support the new service and to be added to the nework are defined. The units are sorted in functional groups which then are distributed to physical units. The third step is to design protocols in the integrated network. This latter step means that the integrated network is essentially service specific. Possibly, but not necessarily, new capabilities need to be integrated also in the terminals when new services are added to an integrated network.

When the integrated service networks were defined, migration issues were not focused. There are at least two aspects of migration. The first one is the relation between legacy networks (i.e. the existing networks, which do not confirm to the new one) and new networks. The other is the relation between users (and the equipment of users) and the services, which used to be provided in one way by a legacy network, but which now can be provided in another way over an integrated access of an integrated services network.

The second relation is basically that the user has to change terminals and other communications equipment, and in most cases also their address (such as telephone number), if they decide to connect to a network of this kind. There is sometimes a possibility to reuse the terminals by adding an adapter, which adapts to the interfaces of the integrated access.

The first type of migration is handled in the following way. The legacy networks are seen as something, which breaks the homogeneity of the integrated network, and is dealt with by Interworking Functions, which map the services of the legacy networks on the services of the integrated network as good as possible. In this way, the connectivity (i.e. the addressable destinations and the information transfer services, which can operate between them) of the new network can be extended to the legacy networks. This may include address conversions between different address domains (e.g. between IP addresses of Internet and E. 164 addresses of PSTN), or it may require the capability to handle addresses of other address plans. The latter is the case e.g. when an ISDN destination (E. 164 address) is called from a PSDN (Public Switched Data Network), which handles addresses according to the X. 121 address plan.

The common understanding of the administrative relationships concerning integrated accesses is that they, like in the case of the dedicated accesses, are extensions of the network, and owned by the network operator.

DATA COMMUNICATION

The control structure of traditional data communication, e.g. Public Switched Packet Data Networks (PSPDN) using X.25 as the main access protocol, is organized in much the same way as PSTN. X.25 supports connection oriented communication services. The access protocols are layered, but essentially the access to an X.25 network is dedicated.

The OSI model (Open Systems Interconnect), aims to separate different concerns, and define an architecture for system interconnection, based on services of different layers, which are provided to client layers. OSI, however does not say anything about access to the services of a system.

The Internet concept, which also has an layered architecture, differs fundamentally from the integrated services network concepts, which originate in the telecommunications area. Internet is not vertically integrated, but provide an IP based connectivity network, which can be used by any application. IP networks provides a connection-less service. IP-based networks do only provide connectivity services. The types of "supplementary services", which are frequent in vertically integrated networks, are lacking in IP based networks.

Access to an IP based network can be arranged by any link, permanent or semipermanent or dynamic (e.g. switched), which can transport IP packets. Such links are usually provided by separate agencies, e.g. a PSTN operator, or someone providing leased lines.

BROADCASTING NETWORKS

A third type of network are the broadcasting networks, which are mainly point-to-multi-point or point-to-any-point networks, distributing a number of TV and/or radio channels.

Often, broadcasting networks do not have addresses. Instead, terminals are connected to an ether, either an open ether, e.g. terrestrial or satellite TV broadcasting, or a closed ether, e.g. cable TV.

In order to confine the distribution of certain TV channels, e.g. in order to allow only paying users to view them, a set top box (STB) is used. An STB can be addressed, and managed in order to decode those the channels paid for.

Traditionally, broadcasting networks are analogue. However, the recent development of broadcasting networks includes the introduction of digital standards, e.g. Digital Video Broadcasting (DVB), and Digital Audio Broadcasting (DAB). Such networks can be used not only for broadcasting of radio or TV channels, but also for distributing other kind of information to several or a single destination.

OVERLAY ACCESS

A different type of access is using the transparent service of another network. In this case, the accessed entity lacks a complete access infrastructure of its own, i.e. its geographical coverage is incomplete. The users of the network are geographically distributed and for economic reasons the network does not cover the user sites. Instead the accessed entity is using the connectivity services of another network (an accessing network) to establish a link between the terminal belonging to the user and the service access point (SAP) of the accessed network. This is the overlay access concept. Entities in the terminal can then communicate with entities in the accessed network, and make the services of the network available to other entities in the terminal. In this way, the SAP of the accessed network can be distributed to all locations, which have access to the accessing network.

This kind of access is frequent for e.g. Internet, which is often accessed over a 28.8 kb/s modem connection to a modem pool of an Internet Service Provider. It is also frequent as an access method to Public Switched Packet Data Networks, standardized in the ITU-T recommendation X.28. It can also be used to access information services (e.g. Videotex services and Bank on Phone).

The overlay access concept is recursive and can be repeated more than once. Imagine a PC (personal computer) connected to the subscriber line via a modem and an Internet server with a modem pool connected to the PSTN. The PC can set up a modem connection to the modem pool via PSTN and access Internet via the Internet server. Over the IP network an application in the PC can reach a voice gateway enabling access to ISDN/PSTN. This is an example of recursiveness of the overlay access concept.

No requirements are made on the ownership of the different access networks. They can of course have another owner than the accessed network.

GENERAL RADIO ACCESS NETWORK

Applicant's PCT/SE96/00510 relates to a radio based access network supporting terminal mobility, and accessing various networks. Terminals are communicating with their service network with the same signaling protocols as ordinary terminals of these networks uses. In case of terminals lacking radio interfaces, they can be connected to a terminal adapter, which has a radio interface. The signaling is conveyed transparent by the general access network.

This preference differs from what is proposed in the present invention in a number of ways. There is a lack of adaption units, and the services of the accessed networks are transparently passed to the connected terminals. Further, the quoted document is restricted to radio access networks. The protocols of the service networks are terminated by the terminals. The service protocols of all service networks have to be terminated in the terminal. This means that the terminal has to be dedicated to all service networks that is supposed to be reached.

RELATED ART

IP BASED ACCESS NETWORKS

Applicant's recently filed patent applications, PCT/SE97/00968, PCT/SE 97/00969 and PCT/SE97/00970 relate to access arrangement using IP as an internal connectivity protocol. The main idea is to give a user access to at least one telephony network, and at least one IP based network, over a common access network. The main components of these applications are adaption units, called network terminals (NT), which can have one or more telephone interfaces (e.g. analogue), and one or more interfaces to computers. Service access points to at least one telephony network and at least one IP based networks are distributed to the NT by the means of the connectivity services of an IP network. An IP link is carried by any suitable transmission technology, e.g. a switched modem connection, or by a copper access line enhanced with a xDSL modem, or an optical fibre or by a CATV network. The access protocols to the accessed networks terminate in other adaption units, named router and telephony gateway, and more general service specific protocols are exchanging service specific control information between the adaptation units. The inventions are based on IP as connectivity technology only, and treats only access to PSTN/ISDN networks and IP networks. The only terminals treated are phones and PC:s.

DISCLOSURE OF THE PRESENT INVENTION

One object of the present invention is to provide access to a multitude of service providing networks of the same type as well as of several different types by means of a common access system. It is also an object of the present invention to provide for an easy adaptation of the available services to individual requests of different users. Another object of the present invention is to provide an access system which is able to access new service providing networks, presenting new services and/or new access protocols, with minimal impact on the access system. A further object of the present invention is to provide an access system which enables the user domain to develop independent of the access network and the service providing networks. Furthermore, the present invention should offer a possibility to use any terminal or combination of terminals for any service, provided that the capabilities of the terminals are sufficient. Yet another object of the present invention is to provide an access system which may use any transmission technique or combination thereof without affecting the implementation of the rest of the access system, providing for the possibility of performing smooth migrations concerning transmission technique. Still another object of the present invention is to provide an access system which may use any suitable connectivity technique or combination thereof without affecting the implementation of the rest of the access system. All the above mentioned objects should be provided by an access system.

The above objects are achieved by a general access system according to the appended claims.

The general access system according to the present invention comprises a connectivity network, at least one access adapter, to which at least one service providing network is connected, and at least one network terminal, to which at least one terminal is connected. The access adapters terminate the access protocols of the service providing networks. The access system distributes the service access points of the service providing networks transparently over the connectivity network to network terminals. The general access system according to the present invention separates different concerns; the different concerns of service providing networks as well as the user equipment are separated from the concerns of the connectivity and transmission aspects of the access arrangements. The access network is transparent to the accessed services. Furthermore, in a preferred embodiment of a network terminal according to the present invention, applications are provided, which are able to connect the distributed service access points of the service providing networks with at least one virtual terminal exhibiting appropriate devices.

BRIEF DESCRIPTION OF THE FIGURES

A number of embodiments of the present invention will be explained more in detail in connection with the drawings, in which.

DETAILED DESCRIPTION OF THE INVENTION

Figure 1:
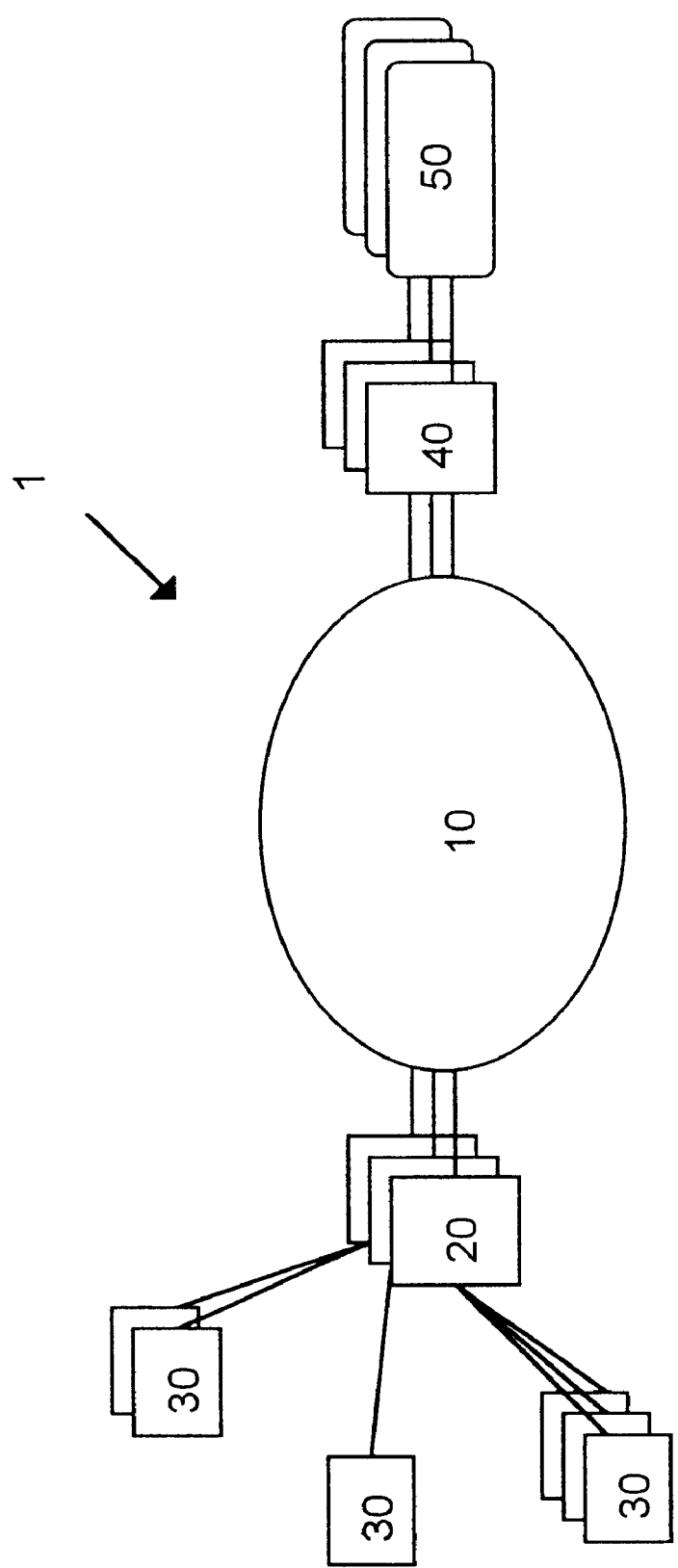
FIG. 1 is a block scheme of a general access system according to the present invention.

In the following, a specialised vocabulary is used and some of the terms are understood to have certain meanings. In order to avoid misinterpretation, some of the terms are defined below.

An access system makes the services of an entity available to another entity. Thus, it distributes an access point for one or several service providing networks. An access system can be transparent, i.e. independent of the services, which are made available. It can also be dedicated, i.e. the knowledge of which services will be supported has been used in the design of the system.

A service is a useful effect an agent entity does for an using entity. This very general and abstract definition of a service can be applied to telecommunications. The basic telecommunication service is the transfer of information over a distance in real time (real time refers to the timing requirements of the external processes, which use the service). Thus, telecommunication services are related to the transfer of information over a distance (doing a useful effect) performed by a telecommunication network (an agent entity) on behalf of a requesting user (using entity). However, in the present document, the term "service" should not be limited to traditional telecommunication services.

Service access points are points where a service is available. The entity, which provides the telecommunication service, is usually a network, i.e. a distributed, shared resource serving several users. From the view of users, a network is visible as a set of distributed service access points, where the services, provided by the network, are available through a defined set of service primitives. In the case of a telephony network, the service access points are often implemented as terminations of "subscriber lines", where a terminal can be connected. In the case of ISDN, the service access points are located at a network terminal.

Networks can be specialized according to the types of services they provide. The simplest form of a telecommunication network is a connectivity network. A connectivity network is characterized by a set of transport services and a set of service access points which are addressed according to an address plan. The transport services can transport information between service access points, either point to point, point to multipoint, or multipoint to multipoint. Connectivity services, i.e. services provided by connectivity networks, can be either connection oriented or connectionless. In the former case, the control services to establish, supervise and disconnect connections, are part of the connectivity services. In both cases, the networks needs routing capabilities. Often, it is not sufficient to only provide connectivity. It may be more convenient to directly address a user or an application, not the service access point which is used. E.g., the Universal Personal Telecommunications service (UPT) provides a personal number, which can be used to call this person, which may use different services and different service access point, belonging to different networks, which may even use different address plans. Such services, which supports communication between users, are here called communication services. In order to provide communication services, connectivity services are necessary. Traditional networks, like PSTN and ISDN, support both types of services.

The term "Service providing network" will in this paper denote a network, which provides communication and/or connectivity services. They may either be networks, which integrate communication and connectivity services, or they may provide only communication services or only connectivity services.

Access networks are a special form of connectivity networks, which (preferably transparantly) provides service access points, where communication services and/or connectivity service of service providing networks are made available to users. In other words, access networks gives a transition from the dedicated resources of individual users to the shared resources of the service providing networks. Traditionally, access networks were dedicated to a certain type of network, and belonged to the same administrative domain.

A network domain denotes a separation of a network in accordance with some principle. In this paper, the principle is either ownership (different administrative domains), or type of services.

A stream is a (continuous or limited) ordered set of data in transit. Examples of continuous streams are an audio stream and a video stream, and examples of limited streams are a still image, a document and a file in transit, or messages, possibly containing control primitives.

A device is an abstraction of a stream handling arrangement, which performs some service on a stream or some streams. This may imply creation of streams, presentation of streams, conversion of streams or storing contents of streams. Stream handling devices are modeled in an abstract way as a set of stream sinks (which consume streams) and sources (which create streams), and a relation between the consumed streams and the created streams.

A physical device is an implementation of a device. A physical device has properties and capabilities determined by the way it is implemented. Examples of physical devices are a video camera, represented as a video stream source or a speech compressor, which changes a speech stream representation.

From the viewpoint of applications in the NT, a terminal is seen as a collection of devices, which are integrated for some purpose. E.g., a telephone, the purpose of which is to be the user interface to the telephony service (i.e. speech communication between persons over a distance in real time), is a collection of four devices: one for creation of a 3.1 kHz speech stream, one for presentation of such a stream, one for creation of control messages to the service providing entity (usually a PSTN) and a device for presentation of control messages from the service providing entity.

A physical terminal is an integrated collection of physical devices (properties and capabilities are determined by the way the devices are implemented). E.g., the four devices of a telephone can be implemented in the following way: a microphone creates a 3.1 kHz speech stream, a receiver consumes such a stream and presents it as sound, control messages are created by hook signaling and a keypad, and finally control messages from the network are presented as tones by the receiver (another option may be visual presentation of control messages on a display).

A virtual terminal is referring to an collection of devices from the point of view of an application residing in a network terminal. The virtual terminal may be composed of devices which are imaging capabilities belonging to different physical terminals. From the point of view of the virtual terminals, they are just devices, not part of a terminal. The level of abstraction differs between "virtual terminals" and "physical terminals". There are two purposes of using the concept of virtual terminal. The first purpose is to create a common level of abstraction, and be able to present all terminals for a certain applications in the same way. The second purpose is to dispose of available stream handling devices in a less restricted way, and be able to use the capabilities of physical terminals in ways, for which they were not originally intended. There may be a one-to-one relationship between a virtual and a physical terminal.

A PC, without application software, is in itself a terminal with rather restricted capabilities. E.g., a PC with IP communication capabilities is seen only as a source and sinks of IP packets. However, a PC and its connected peripherals can be seen as a platform for terminals, which are defined by the capabilities of the hardware and software, especially its communication capabilities. A PC can host applications implementing terminals for e.g. telephony, video presentation and interactive multimedia.

An important separation in the analysis of telecommunication systems is the conceptual separation of control aspects and stream aspects. This means that control messages are not themselves considered as streams, when a telecommunication system is analyzed or described. But from certain points of view, when the semantic of the control messages is not the issue, e.g. from a communication point of view, control messages can be viewed as streams. In such cases, control messages can be treated in the same way as other streams, i.e. there are sources and sinks, and they can be carried by transport services. From the point of view of an access network, control messages to the accessed networks are just like any other stream.

Entities like terminals, devices, virtual terminals, SAPs etc. are represented in the network terminal by abstract and/or physical entities, which can be used by other entities such as applications.

Referring to FIG. 1, a general access system, generally denoted by 1, according to the present invention comprises a connectivity network 10, implementing an access network, which has capacity of transporting information in a transparent manner between selected ports of the connectivity network using an address plan. It should be noted, that the connectivity network 10 is transparent, but not necessarily the entire access system 1. An number of network terminals 20 are connected to the connectivity network 10, which network terminals 20 in turn are connected to a number of terminals 30. The type of terminals 30 is variable within one network terminal 20 and the type and number of terminals 30 may be different for different network terminals 20. A number of access adapters 40 are connected between the connectivity network 10 and a number of service providing networks 50. All access adapters 40 and network terminals 20 are associated with at least one address of the connectivity network 10.

The access adapters 40 terminate or bridge the access protocols of the accessed service providing networks 50. For each specific communication between a network terminal 20 and an access adapter 40, a specific set of service primitives is used. For each service a specific set of service primitives can be used, suitable e.g. for telephony, data communication, or video respectively. The network terminals 20 further comprise applications, which may enhance the services before they are made available for the terminals 30.

Figure 2:
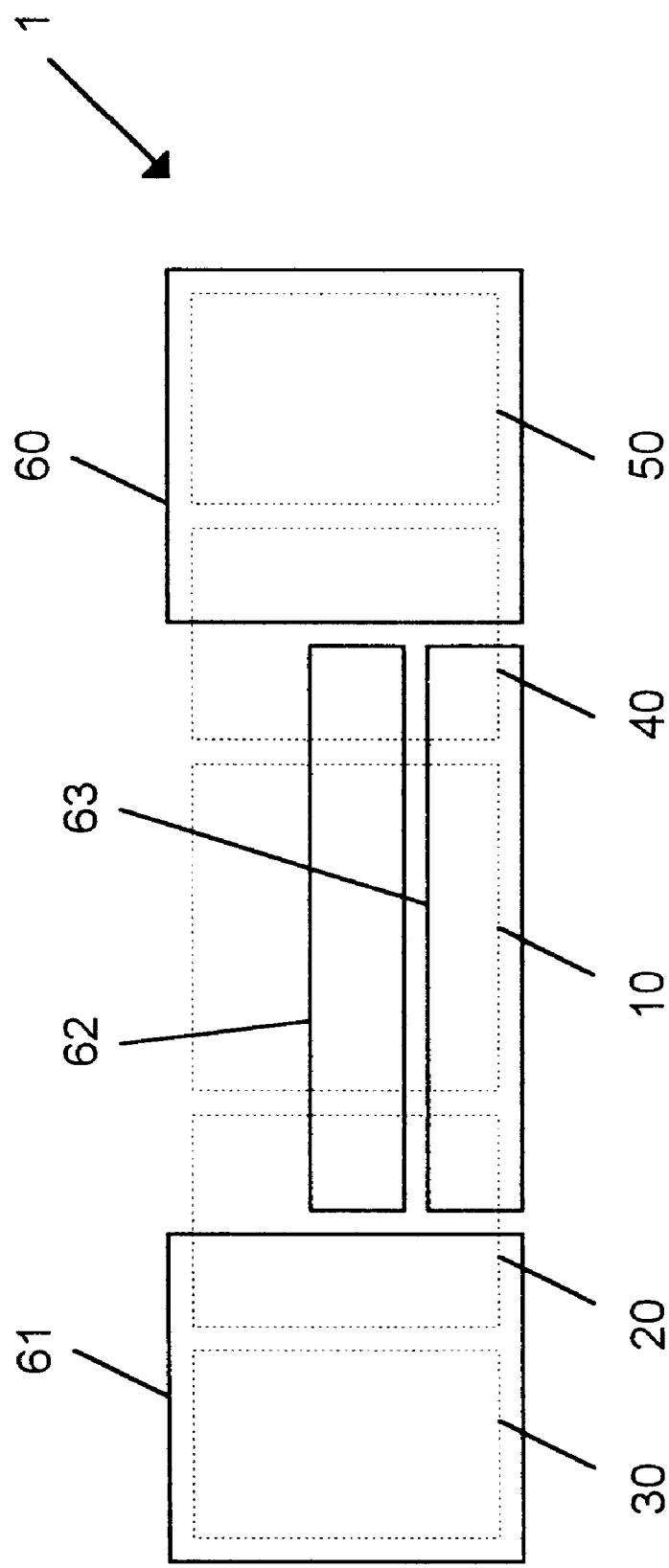
FIG. 2 is a conceptual domain scheme of a general access system according to the present invention.

A general access system 1 according to the present invention supports a separation of different concerns. Referring to FIG. 2, the general access system 1 is presented in separated domains (full lines), and functional entities (broken lines).

Firstly, the different service providing networks 50 are separated from the access arrangements into a service providing domain 60. The service providing domain comprises the accessed service providing networks 50 and the service dependent means in the access adapters 40 including their communication with the service providing networks.

Secondly, the concerns of a user domain 61, comprising the terminals 30 and terminal dependent means in the network terminal 20 as well as the communication means, such as a local area network (LAN) between the physical terminals and the network terminal. The user domain further comprises the service dependent means in the network terminals.

Thirdly, the user domain and the service providing domain are related to each other via an access network domain, divided in a connectivity domain 62 and a transmission domain 63.

The role of entities in the access network domain, divided in the connectivity domain 62 and the transmission domain 63 are to bridge between entities in the user domain 61 and entities in the service providing domain 62. The requirement on the access network domain is that service primitives, both control and for stream primitives can be transparently conveyed between selected network terminals 20 in the user domain and access adapters 40 in the service providing domain. Each entity must be able to simultaneously exchange primitives belonging to different communication sessions.

The connectivity domain 62 comprises at least one connectivity network, able to transport information between any of its ports, either point-to-point or point-to-multipoint. At each port, several sessions communicating with different destinations can be simultaneously supported. How the connectivity services are provided is not a concern of its users, i.e. the using entities in network terminals and access adapters. Different connectivity technologies will, however, require different adaptations to adapt the connectivity network to fit the using entities. Possible connectivity techniques are ATM, IP, Frame Relay and also circuit switched networks with multiplexing capabilities.

The transmission domain provides a limited transport service. It provides links to the connectivity domain. A link can transport information between points, either point-to-point or point-to-multi-point. This is the only requirement from the connectivity network. Different transmission techniques may require different adaptations to fit the using entities.

The strict separation of concerns between the domains is an important tool in allowing independent technological development to take place within each domain. Furthermore the transparence provided by the access network domain allow that in issues related to the use of service between the user domain 61 and the service providing domain 60, the access network domain can be abstracted away.

The user domain 61 areas has its own technological development, and is from a commercial point of view strongly related to the consumer market. This is further supported by hiding each terminal 30, and the means by which it is communicating with the network terminal 20, behind an abstract shell, which makes the terminals 30 as equal as possible from the point of view of applications in the network terminal 20. For example, the difference between an analogue telephone and a digital display telephone need not be visible at all outside the user domain 61, as long as both telephones have the same capability of producing a set of control requests and present a set of control messages to the user. The communication applications in the network terminal 20 are not concerned about the difference. Each terminal communicates with its defined protocols. Standard communication solutions are used for connecting the terminals to the network terminal. Also these protocols are hidden to the applications of the network terminal.

The division of the access network domain into two parts makes it possible to use any existing or future connectivity network on any existing or future transmission network and physical medium. The access network may also be built up by more than one connectivity and transmission network. Existing types of connectivity networks, such as ATM networks, IP networks, frame-relay networks, digital broadcasting networks and broadband radio networks, are easily adaptable for acting as the connectivity network of a general access system according to the present invention. The capabilities of any particular connectivity network may restrict the set of services which can be accessed e.g. due to bandwidth or other quality constraints.

Furthermore, the connectivity network is not concerned about how a certain link of the transmission domain is provided. Neither is a link concerned about how other links are provided. A link can be provided by any connectivity network or communication network, which have the capabilities to transport information between the required points. A link can also be provided by any of a manifold transmission technologies, which can use a suitable transmission medium out of a manifold.

For the provisioning of a single link (from the point of view of the connectivity network), a manifold of transmission techniques and physical media can be used, as well as a manifold of connectivity technologies.

Among transmission protocols which may interface to a network terminal are xDXL over a copper wire, DECT over a CATV coax cable, IEEE 802.14 over a CATV coax cable, DVB and DAB over a coax cable from an antenna, IEEE 802.3 over wire. A number of other physical media can be thought of, e.g. optical fibre and a power cable equipped with a high frequency modulation.

In cases, where the highest amount of data transferred to and from the network terminals, it could be of benefit, if the traffic in the different directions used different access networks. In a case where network terminals are collecting large amounts of data from the service providing networks, but only produces some sparse control signaling, one could e.g. use copper wire technology for the low intensity data transfer from the network terminals, while the large amount of data to be transferred to the network terminals may use e.g. a satellite digital broadcasting system.

Making connectivity and transmission independent on each other increases the flexibility and ability to accept migration of connectivity or transmission networks as well as to accept new technology in such areas.

The access network 10 is further transparent to the accessed services of the service providing networks 50, which will be described further in detail below.

Figure 3:
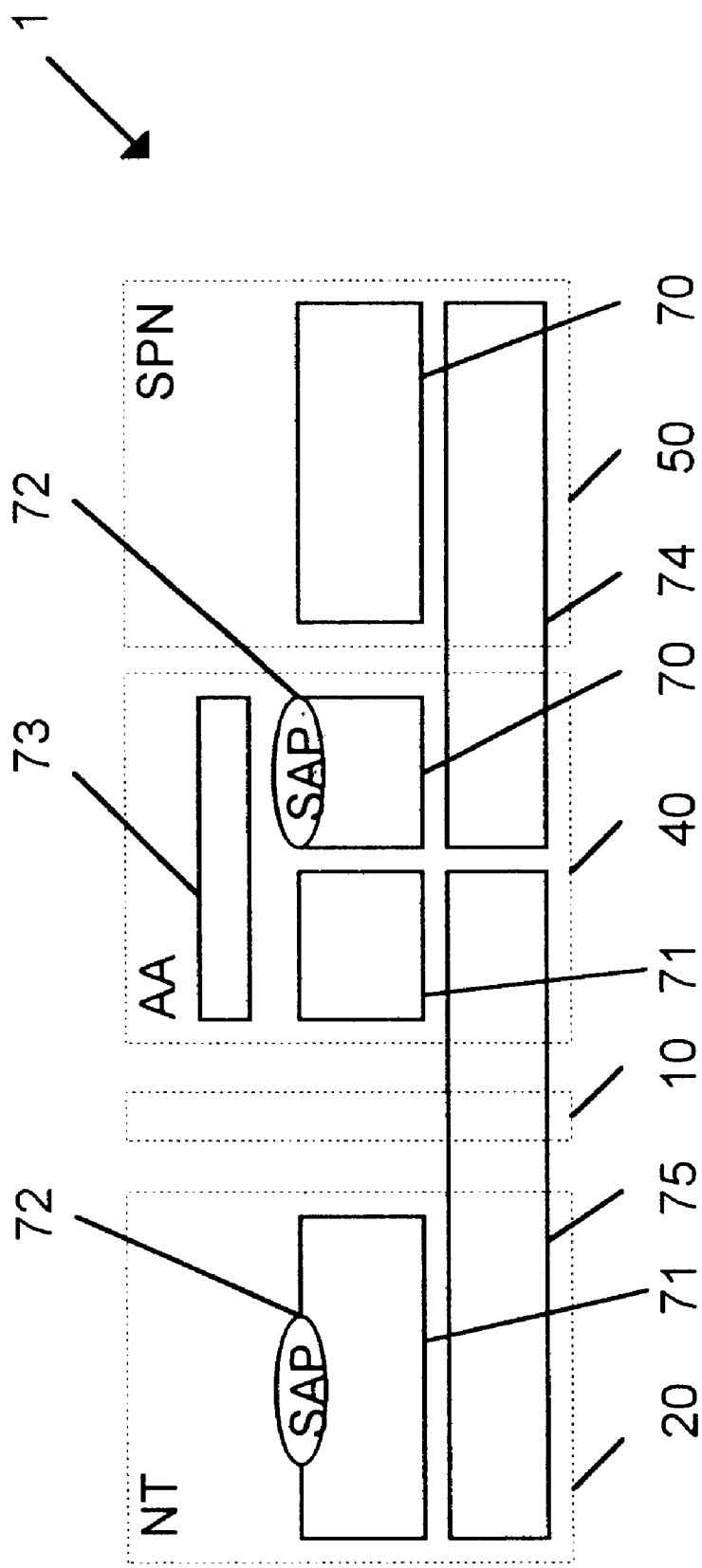
FIG. 3 is a scheme of the distribution of a service access point according to the present invention.

A main principle of a general access system 1 is the transparent support of access to several network services. A main means is the distribution of service access points (SAPs). A SAP is characterised by a location and the service, which is provided at that location. The service can be described as a set of service primitives (stream services, which handles the information that will be delivered, and control messages, which controls the stream delivery service) in both directions. FIG. 3 illustrates the principles of the SAP distribution, in which the set of service primitives are made available at another location. The SAP 72 of a service providing network 50 is distributed to the access adapter 40 by a standard access protocol 70 of the service providing network 50, e.g. V5 or some PABX protocol for PSTN/ISDN and IP for Internet, over a transport service of access link 74. The standard protocol 70 is terminated in the access adapter 40. The terminating means in the access adapter 40 extracts the service primitives of the service providing network 50, and forms a set of service access points 72. If these SAPs are static or can be created on demand, is not an important matter from the point of view of SAP distribution. There may be at least one SAP 72 for each subscriber to the service of the service providing network 50, which is connected through the access system 1. At these SAPs, the service primitives of the service providing networks are available. For a certain type of service, different networks may express their service by different sets of service primitives. In case a set of SAPs from different networks of the same kind were distributed to the same network terminal, and the service primitives for each of these similar service were different, it would make things complicated for an application. In the access adapter, there might therefore be provided for service adaption means 73, for mapping of the service primitives as they are expressed in the service providing network 50 to a suitable selected set of service primitives, common for the access system.

The access adapter will also provide for access network adaptation means 71, which provides adaptation of the service primitives to the transport service, which is provided by the connectivity domain. Such communication adaptation means in the access adapter may e.g. comprise segmentation/assembly and rate adaptation. Further, the access network adaptation means 71 may provide means to control the connectivity service of the access network, and means to uniquely relate a distributed SAP and its different components to the corresponding SAP in the access adapter and its corresponding components. The connectivity service delivers its load to a corresponding access network adaptation means 71 in the network terminal, similar to the one in the access adapter, which extracts the transported service primitives, and offers them at the distributed SAP to a using entity. In the same way, service primitives that are offered the distributed SAP, are adapted by the access network adaptation means 71 and transported by the connectivity service to the access adapter. Since the access network 10 is able to support connectivity services between any network terminal 20 and any access adapter 40, it is possible to distribute SAPs 72 of any connected network 50 to any network terminal 20. Several SAPs 72 can be provided to one and the same network terminal 20. In reality, the SAP of a certain service providing network is only distributed to network terminals belonging to subscribers of that particular service providing network.

However, the access concept is recursive, which means that any communication service can be used to access another communication or connectivity service. An example of this is given in FIG. 12, which indicates how a telephony service according to the standard H.323 can be provided over an IP network. In this way, the SAP of an IP network is used by the protocol applications TCP and UDP, which in their turn are providing communication services, which are used by the H.323 protocol, which is providing a SAP for a telephony service. In this way, all services which can be reached over any accessed network, can also be made available in the network terminal.

The SAP distribution should be performed in such a way, that the address of the original SAP, uniquely identifies the distributed SAP. This requires that the SAP distribution entities can relate the both involved access points of the connectivity service to that address.

The SAPs related to IP access may require a special attention. A SAP of an IP network is defined by a source and a sink only, which can deliver and consume IP packets. An application using an IP SAP may e.g. be an IP router.

By introducing other protocols in the network terminal as applications over IP, like TCP and UDP, any other service, which can be reached over these protocols can get its access point distributed to the network terminal. This is the way to distribute e.g. a POP server, which includes a mailbox.

The access system may support bridging, by which a protocol of a service providing network is bridged over the access system to an entity connected to the network terminal. The protocol is thus not terminated in the access system but the entities of the service providing network protocol are conveyed transparently over the major part of the access system. They are finally made available at a terminal interface of the network terminal. The service providing network protocol may be of almost any kind, e.g. an access protocol, such as a PABX access protcol or V5.2 access protocol, or an internal protocol, such as a mobile protocol connecting base radio stations. It is thus possible to connect remote units, such as PABX to a certain network. It is also possible to connect remote units of a service providing network to the rest of the network by the means of the access system. In this case, however, the flexibility is lost, and the remote unit is connected to one service providing network only. Example of such remote units are a base radio station, a small central office of a telephone network, a PABX and a part of an Intranet.

Figure 4:
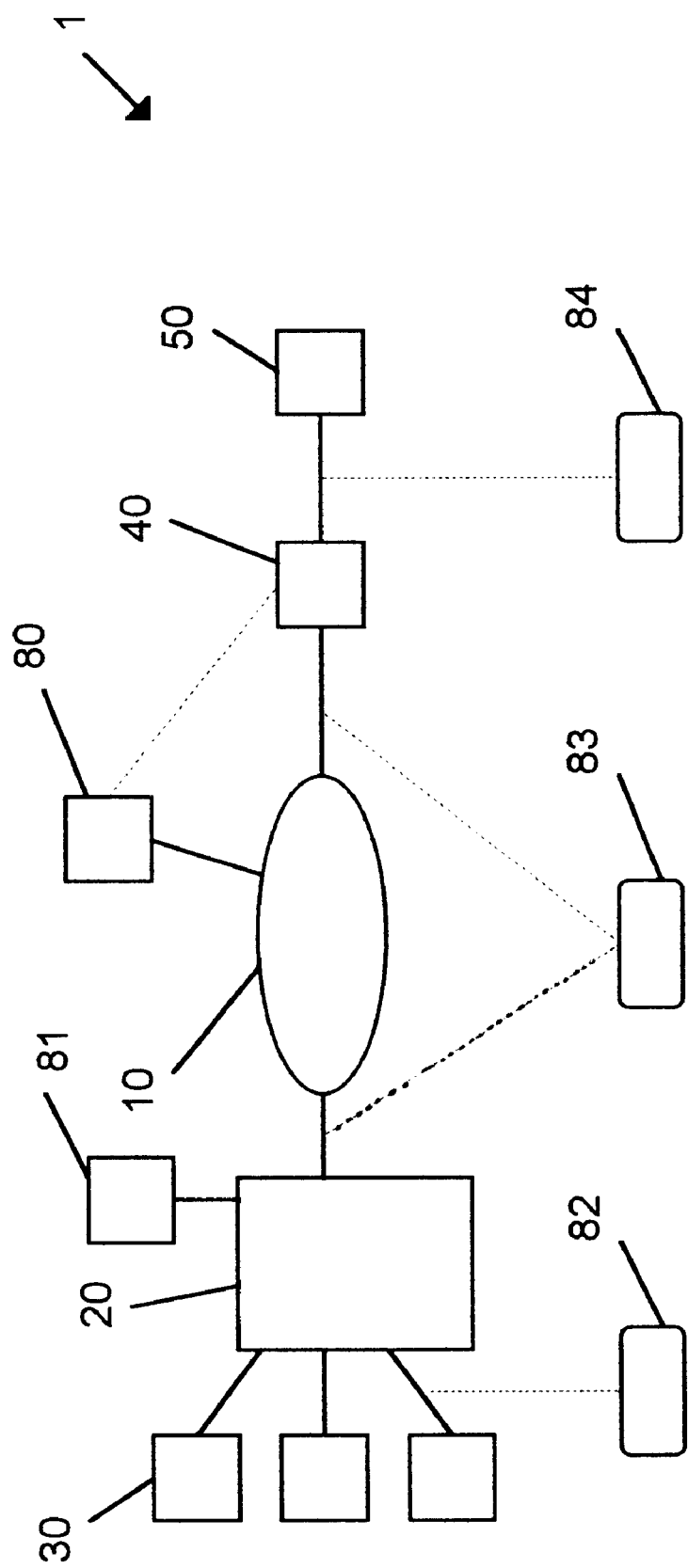
FIG. 4 is a block scheme illustrating the address mapping in a system according to the present invention.

An important aspect of the general access system is the handling of addresses. This is schematically shown in FIG. 4. Each accessed service providing network 50 has its own, public address space. These addresses 84 are known to and used by users of the networks. The access network 10 does not necessarily have a public address space. The preferred case is that it has an internal address space only. Since destinations are addressed by addresses of such service providing networks, the access system 1 has to be able to map the external addresses 84 on the internal addresses 82, 83 of the access network to a terminal, a group of terminals or to an application.

The address mapping is done in two steps. The first step is the mapping of an address of a service providing network 84 (e.g. a PSTN or Internet) on an address of a network terminal 83. This is the responsibility of the access network operator. The second step is the mapping of the address on an address 82 of one (or more) addressable entities in the user domain, e.g. a port of the network terminal 20, or a port of a LAN, which is connected to the network terminal 20 or an application on a PC. This mapping is the responsibility of the owner of the network terminal 20.

The address mappings are controlled by gatekeeper functionality. A first gatekeeper 80 handles the first mapping step. Preferably, it is available at the access system level, i.e. it is accessible by all access adapters 40 as a common resource. The first gatekeeper 80 is able to map external addresses 84 on internal addresses 83 in the access network 10. Alternatively, the first gatekeeper can be distributed to the different access adapters, so that each access adapters only have access to gatekeeper functionality associated with the service providing networks of that particular access adapter.

A second gatekeeper 81 is comprised in each network terminal 20. This gatekeeper 81 keeps track of the specific addresses 82 within the network terminal 20, and is preferably possible to reconfigure by the owner of the network terminal 20. A simple way to implement this is to use a web browser on a PC, which directly may communicate with a configuration means for the gatekeeper 81.

A certain addressable entity 30 can be associated with several addresses 84, belonging to networks of the same type, or even to networks of different types. E.g., a PC with a telephony application can be associated with addresses of more than one PSTN numbers and also IP addresses.

A certain external address 84 can also refer to several addressable entities 30 in one and the same user domain. Eg., a PSTN telephony number may address an analogue telephone, a digital telephone on a LAN, and a telephony application in a PC. An incoming call will then by the first gatekeeper 80 be directed to the right network terminal 20, where the telephony application, supported by the second gatekeeper 81, will be responsible for the selection of addressable entities 30. An incoming call can, for instance, be alerted on all of these destinations, or a subset thereof. Such second gatekeeper 81 functionality is comprised in the applications in the network terminals.

Stream handling devices are in most cases specific for the type of a stream. A video camera is a source of a video stream, a microphone is the source of an audio stream. Video streams are presented on a screen, or on a window on a screen.

Thus, the screen is a sink of the stream. Audio streams are presented by e.g. a loudspeaker. There are also more generic sources and sinks, e.g. a memory, which can be both a source and a sink of any type of stream, which has a digital representation. Also control messages for user interaction with a network can be seen as limited streams. Stream handling devices may also convert streams, e.g. from one representation to another. The functionalities of a physical terminal thus can be seen and made available in the network terminal at a terminal access point, TAP (in analogy with the SAP). What is hidden beyond the TAP does not directly concern the network terminal and the applications residing therein.

Like the SAP concept, the TAP concept may also be recursively applied. E.g., a PC may host a H.323 telephony application, which is carried over TCP/UDP, which is carried over IP. If these protocols are terminated in the NT, a telephone TAP will be visible. (Compare FIG. 12.)

Below, is described how the physical terminals are described and represented in the network terminal. Generally, as abstract description as possible is desirable, i.e. as many details as possible should be left out. The level of abstraction may vary, depending on how much of its capabilities that is necessary to make visible.

A telephone may accordingly be described as a collection of abstract devices: a 3.1 kHz audio stream sink (representing a receiver), a 3.1 kHz audio stream source (representing a microphone). The representation of the stream is essential. There is also a set of outgoing control messages, and a set of incoming control messages. The control messages are service specific. However, an analogue telephone produces events, e.g. off hook, which may be interpreted as a request to make an outgoing call, if the phone is idle, but as an answer, if the phone is alerting an incoming call.

Seen from the interface of a network, a traditional analogue phone can be represented as a receiver, i.e. a sink of an 3.1 kHz audio stream, and a microphone, i.e. a source of another 3.1 kHz audio stream. The representation of the streams is an amplitude modulated current, but this knowledge may be kept within the object representing the physical phone. Another possibility is that a codec is permanently connected to the telephony access. In that case, the streams are represented as 8000 octets/s, encoded according to some standard. The telephone can also issue a set of control messages: off-hook, on-hook, R-key (or hook-flash), the digits 0–9 and the characters * and #. It can receive a set of tone messages, and a ringing signal. The tone messages are delivered to the audio stream sink.

In a similar manner, a GSM telephone can be represented as a receiver and a microphone. The representation of the streams is a 13 kb/s digitized speech, but this knowledge may be kept within the object representing the physical GSM telephone. There are also a set of control primitives given by the access protocol. These primitives are related to the telephony service, but with additional primitives compared to the PSTN service. E.g., a mobile phone can be activated and deactivated, and the identity of both the terminal and the user (represented in the GSM case by a SIM card) can be transferred over this protocol. The GSM telephone may be used in the system by placing a mini base station interface in the network terminal.

Thus, from the viewpoint of a network terminal, the TAP of a physical GSM phone looks different compared to a TAP of an analogue phone. However, an analogue telephone can be transformed into a virtual mobile phone, and a mobile phone can look like an virtual ordinary phone.

A PC with TCP/IP communication capabilities is in itself a source and destination of data communication. A PC may also be equipped with multimedia capabilities, e.g. video camera, microphone, loudspeaker and video presentation screen. A PC with a Web Browser can also interact with any Web server, and provide control primitives of any kind that the server supports. A TAP of a PC equipped in the above described manner is thus possible to interpret not only as a PC TAP but also as a TAP of either an analogue telephone or a GSM phone, if only parts of the capabilities are considered.

If a pair loudspeaker and corresponding driver is connected to the network terminal, it can be accessed from any application with the need to present audio information. Such a system would then be represented as e.g. two audio sinks, capable of receiving e.g. 15 kHz audio streams. There may also be a set of control primitives, e.g. for volume control.

A card reader stores a piece of information, which can be made available as data for any application. The card may be e.g. a GSM SIM card or a credit card.

Virtual terminals are entities, which are visible for an application in the network terminal. Lika a physical terminal, a virtual terminal is composed of a set of devices and a set of control primitives. However, these devices may be separate, e.g. belong to different physical terminals. In such a case, it is the virtual terminal which integrates these separate devices into something that from a communication applications point of view acts as an integrated terminal.

Since the physical terminals are the entities, which can be addressed, not their individual devices, we need also this level of description. The devices of the virtual terminals are available through the TAPs of the physical terminals.

Seen from the interface of a network, a traditional analogue phone can be represented by its TAP as a receiver, i.e. a sink of an 3.1 kHz audio stream, and a microphone, i.e. a source of another 3.1 kHz audio stream. The telephone can also issue a set of control messages, which are specific for the telephony service. Here the service primitives according to a subset of the ISDN access protocol for circuit mode connection control are used as an example. Control messages to the terminal is e.g. ALERTING, CONNECT, DISCONNECT, SETUP and START DIALLING, and control messages from the terminal is e.g. ALERTING, CONNECT, DISCONNECT, BUSY, and SETUP.

Figure 5:
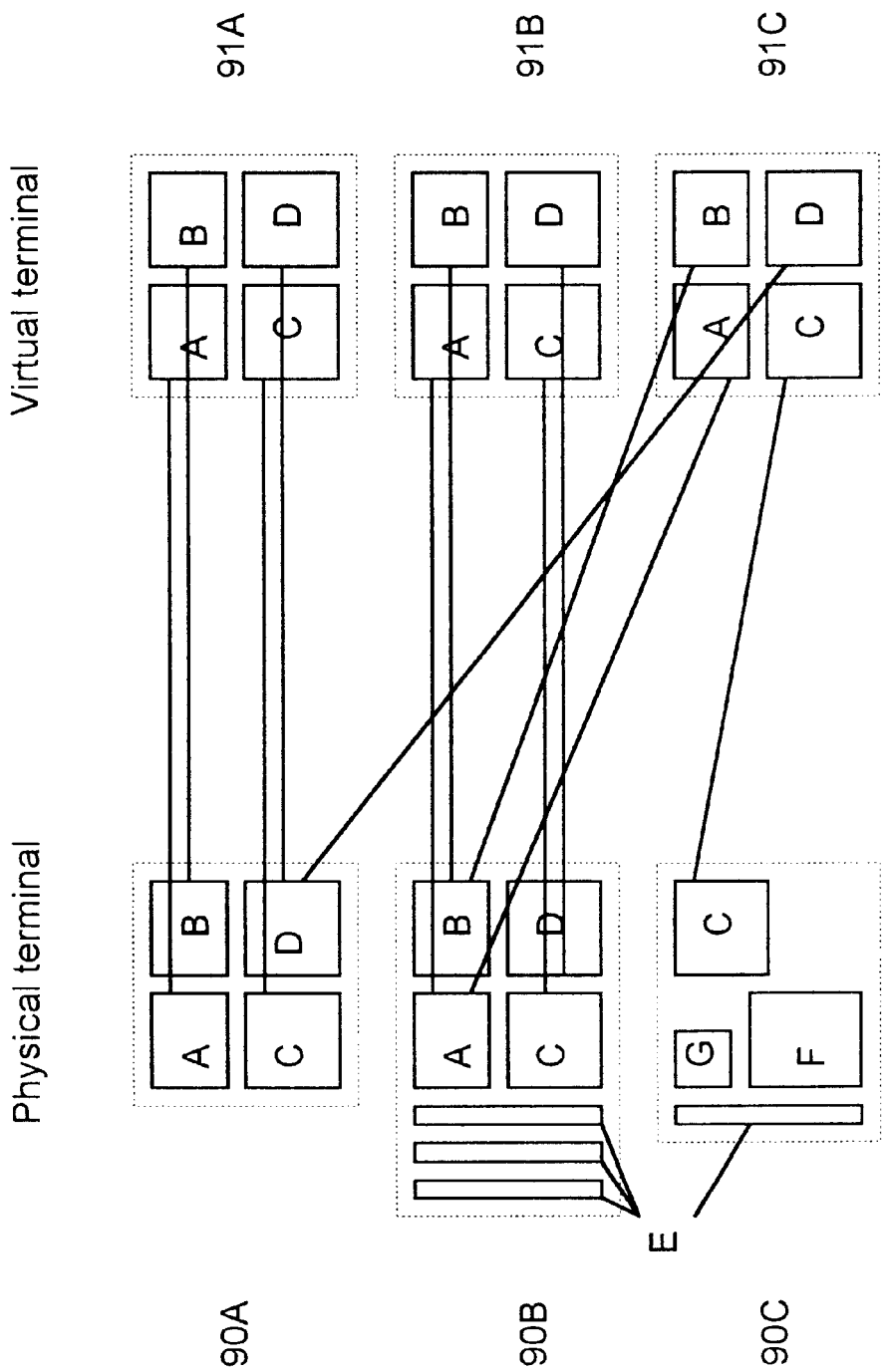
FIG. 5 illustrates the definition of virtual terminals.

FIG. 5 shows schematically the connection between physical and virtual terminals. Three physical terminals 90A, 90B and 90C comprise a number of devices A–G. The three physical terminals are intended for different services and, accordingly, comprise different sets of devices A–G. Three virtual terminals 91A, 91B and 91C are defined, which are capable of handling the service intended for the physical terminal 90A. In virtual terminal 91A, the devices A–D from physical terminal 90A are selected for building the virtual terminal, which is the complete set of devices of the physical terminal 90A. There is thus a one-to-one relation. The virtual terminal 91B, dedicated to the same service as the physical terminal 90A comprises the devices A–D from physical terminal 90B, which in this case is not the complete set of devices of physical terminal 90B. In virtual terminal 91C, the device D is selected from physical 90A, device A and B from physical terminal 90B and device C from physical terminal 90C. In this case, a completely new virtual terminal is constructed, which has no one-to-one relation with any existing physical terminal.

Accordingly, it is possible to define a virtual telephone by combining devices supporting the above specifications. It is thus possible to use devices of a GSM telephone or a PC with multimedia equipment to define a virtual telephone. It is even possible to select devices from separate physical terminals, which together will meet the above specifications. A somewhat odd example would be to combine one loudspeaker at a home LAN, as the sink of the audio stream, the microphone at a GSM telephone, as the source of the audio stream, and a Web browser of a PC, for handling the control messages, as one virtual analogue telephone, which can be accessed from the network terminal.

The service primitives may be generated by the virtual terminal entity, or may actually be transformed control messages from a physical terminal. E.g., if an analogue telephone signals off hook, this can be interpreted as a call request signal, or as a disconnect signal, depending on the conditions.

A virtual mobile phone can be described by a superset of the service primitives of the telephone. The difference is that a mobile phone can be switched on and off (or be within or outside the coverage area of the base station), which requires a couple of messages. Further, a mobile phone has a terminal identity as an attribute, and a user identity, e.g. corresponding to a SIM (Subscriber Identification Module) card can be attached to a mobile phone.

The control messages are at least the set of control messages defined for a virtual phone. In addition to that, the messages PRESENT and ABSENT are needed. The former one, which is assumed to carry the information in the SIM card, is issued when a terminal is activated, or enters the range of the base station. The other information is issued when the base station detects that the phone is no longer present (or will be issued at similar criteria).

A virtual radio has one or two sinks of audio streams, and a set of control primitives for e.g. channel selection and adjustment of the presentation of the audio streams, like volume control and balance between the left and right loudspeaker.

There is the same distribution problem for virtual terminals or TAPs as for SAPs. The physical terminals are connected to the network terminal over some kind of access arrangement, e.g. a copper line or a home LAN (using e.g. radio or wire as the physical medium). A link protocol over a transmission protocol is carrying the access point of the terminal into the network terminal. Any type of link arrangement will suffice, provided it has the necessary multiplexing capabilities and stream transmission qualities.

In a network terminal, a SAP of a certain network may be directly tied to a TAP of a physical or virtual terminal. E.g. a telephone may be permanently allocated to a PSTN SAP in such a way, that incoming calls from that PSTN always are directed to that phone, and outgoing calls from that phone are always directed to that PSTN, and the speech streams are transparently passed. The entire access system would thus be transparent to the services of that PSTN, in relation to that particular terminal. However, if there are several networks providing the same service, it is possible to enhance the service of the different networks by introducing a set of applications in a network terminal. An application can use a set of TAPs of virtual terminals, which are dedicated to that application, and can reach the services available at a set of SAPs. A simple telephony application can comprise a network selection function for outgoing calls, i.e. the possibility to select a specific network for outgoing calls. It can also comprise a destination configuration function for incoming calls, i.e. which virtual terminals that shall be alerted when a certain directory number has been dialed from a certain origin. It may also comprise the possibility for internal calls or other features.

Figure 6:
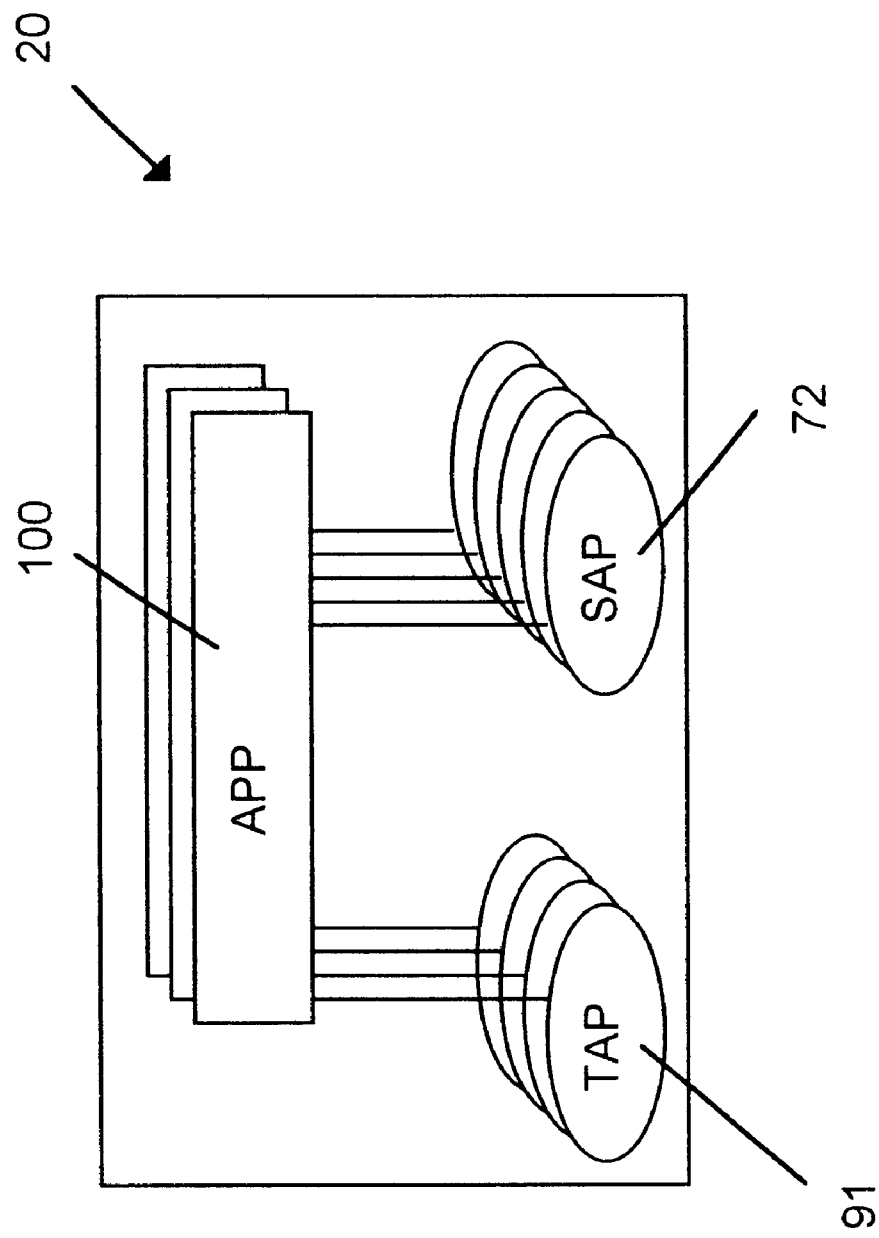
FIG. 6 illustrates the role of applications in a network terminal according to the present invention.

In FIG. 6, the applications of a network terminal is shown schematically. A number of SAPs 72 corresponding to different service providing networks are present in the network terminal 20. The SAPs 72 are characterised by their set of service primitives. A number of TAPs of virtual or physical terminals 91 are also present in the network terminal 20, and these TAPs are characterised by their set of service primitives. A number of applications 100 residing in the network terminal 20 is the connecting link between the set of SAPs 72 and the set of TAPs 91. An application 100 is then able to use any service offered by the service primitives of the SAPs 72, enhance it, and offer it to the user via service primitives of any TAP 91 which corresponds to a set of devices which covers the used service primitives of the SAPs 72.

The applications 100 are dedicated to a certain type of services, and may e.g support telephony, IP, multimedia or TV distribution. Other more specialised applications, and combination applications are also possible.

Furthermore, an application 100 in the network terminal can also be configured to comprise services at its own. The application 100 is thus possible to communicate with the service providing networks 50 via the available SAPs 72, without interacting with any virtual terminal. One example in telecommunication could be to comprise the functionality of a telephone answering application or a fax mailbox in the network terminal 20. In the same manner, certain services can be provided to the user of a virtual terminal without accessing the SAPs 72. An example here, in the field of telecommunication, would be the possibility of internal phone calls between virtual telephones associated with one and the same network terminal 20, e.g. using ordinary telephones as local telephones.

In the view of applications, a SAP and a TAP are similar in their structure. They both exhibit a set of service primitives, which can be used by the application. It is thus possible for an application also to use the "services" based on the capabilities of a terminal via a TAP.

It should be mentioned that the applications may not necessarily reside in the network terminal. By defining an API (application programming interface), which is a set of control primitives, the API primitives can be made accessible elsewhere in the same way as the SAP distribution.

Figure 7:
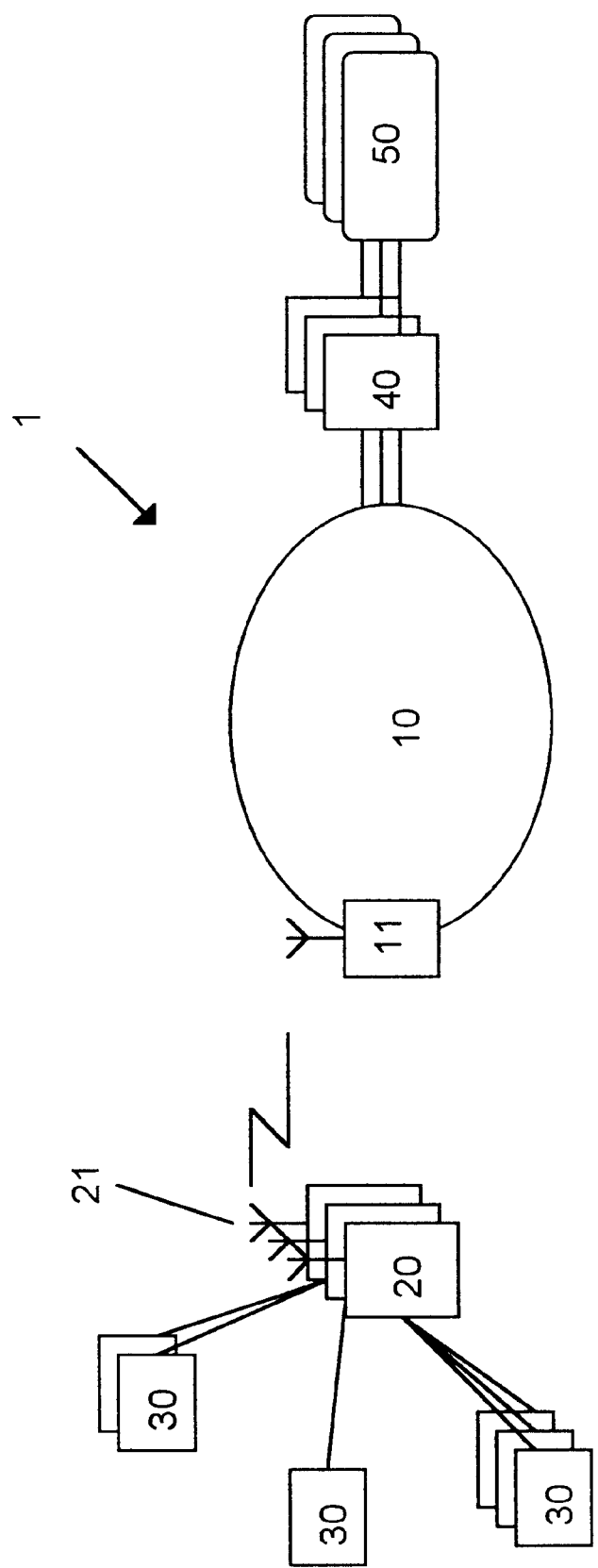
FIG. 7 illustrates an access system comprising a radio communication in the connectivity network.

Mobility and mobile networks within the concept of the present invention need some further attention. The connectivity service of the access network may be provided by a radio access network 11, i.e. the network terminals would in such a case have a radio interface 21 (as shown in FIG. 7). A network terminal 20 would then be able to move within the coverage area. If the radio access network supports roaming, this area may be very large. If the network also supports handover, all accessed services will be available to the network terminal while it is moving between cells of a cellular network.

Mobile networks can also be part of the transmission domain, and provide links to the connectivity network. Especially, a link connecting a network terminal can be provided by a radio access network. In that case, the connectivity network will see fixed links, and is not aware of the mobility capability of the link. However, the NT will be able to move within the coverage area in the same way as described above.

Mobile networks can also be connected as service providing networks in different ways. An access adapter can interface as a base station (or a base station controller or corresponding entities) to a mobile network. Users connected to a network terminal 20 would then be able to appear as users, using any of the known terminals. If the same level of security and authentication as in GSM could be upheld, a user would then be able to access a GSM network from e.g. an ordinary analogue phone. In this case, the protocol between the access system and the service providing network is not a traditional access protocol, but an internal protocol of the mobile network.

Figure 8:
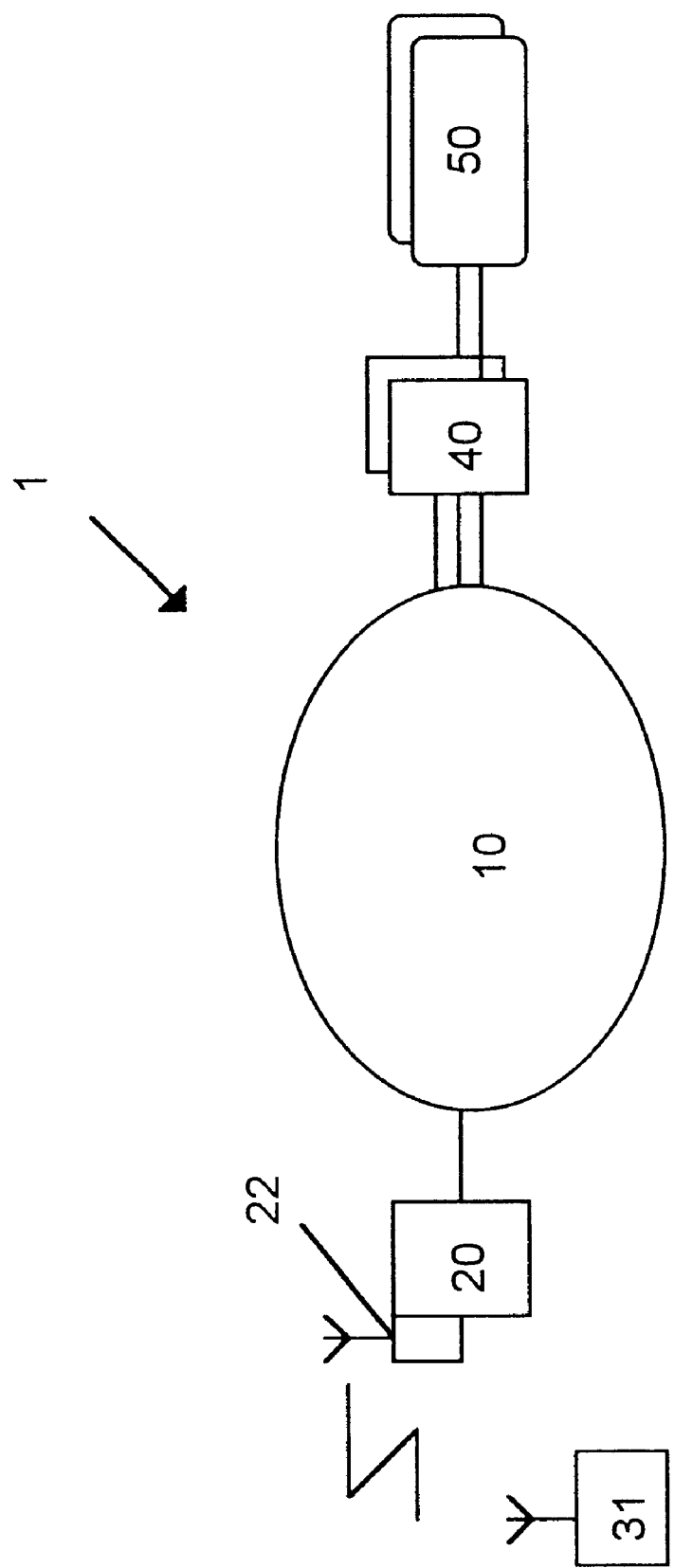
FIG. 8 illustrates an access system comprising a mobile telephony network as a service providing network.

Referring to FIG. 8, mobile phones can also be connected to a network terminal by including a mini base station interface 22. By means of the virtual terminal concept, a mobile telephone 31 can appear as an ordinary phone, and be used to receive and place calls from/to a fixed network. It will thus function as a cordless telephone.

A base station can also be connected to an NT by transparently bridging the mobile network protocol towards base stations through the access system. In this case, the AA does not terminate the protocol, but conveys the protocol entities over the access network to an NT, where the protocol entities are transparently passed to an interface. In this way, the ordinary interface towards a base station can be made available at the terminal side of an NT where a base station, thus extending a specific mobile network, can be connected. This type of bridging can also be applied to other distributed network entities.

The services of broadcasting networks can be made available to applications in a network terminal. This can be achieved in more than one way. One way is to connect the broadcasting network to a network terminal. The network terminal may have an inlet from a satellite antenna, or from a terrestrial broadcasting network, or from a CATV network. The network terminal then functions as a combination of a decoder, set top box and network terminal. All permitted channels are available in the network terminal, and can be presented on any suitable terminal.

Another solution is also possible, using the structure of the access network system. A set of TV and radio channels may be available at an access adapter in the access system, and the users can request a certain TV or radio channel at this point. A connection will then be established, and the channel delivered over that connection. The broadcasting application will then deliver the channel to the wanted virtual terminal, which then is of a video type terminal. A broadcasting application requires a protocol in order to communicate with the source access adapter.

In the same way, the video on demand service can be handled, and also other services which can present e.g. music on demand.

A number of examples will be given below, emphasising the rich variety of embodiments possible within this invention.

EXAMPLE 1

Figure 9:
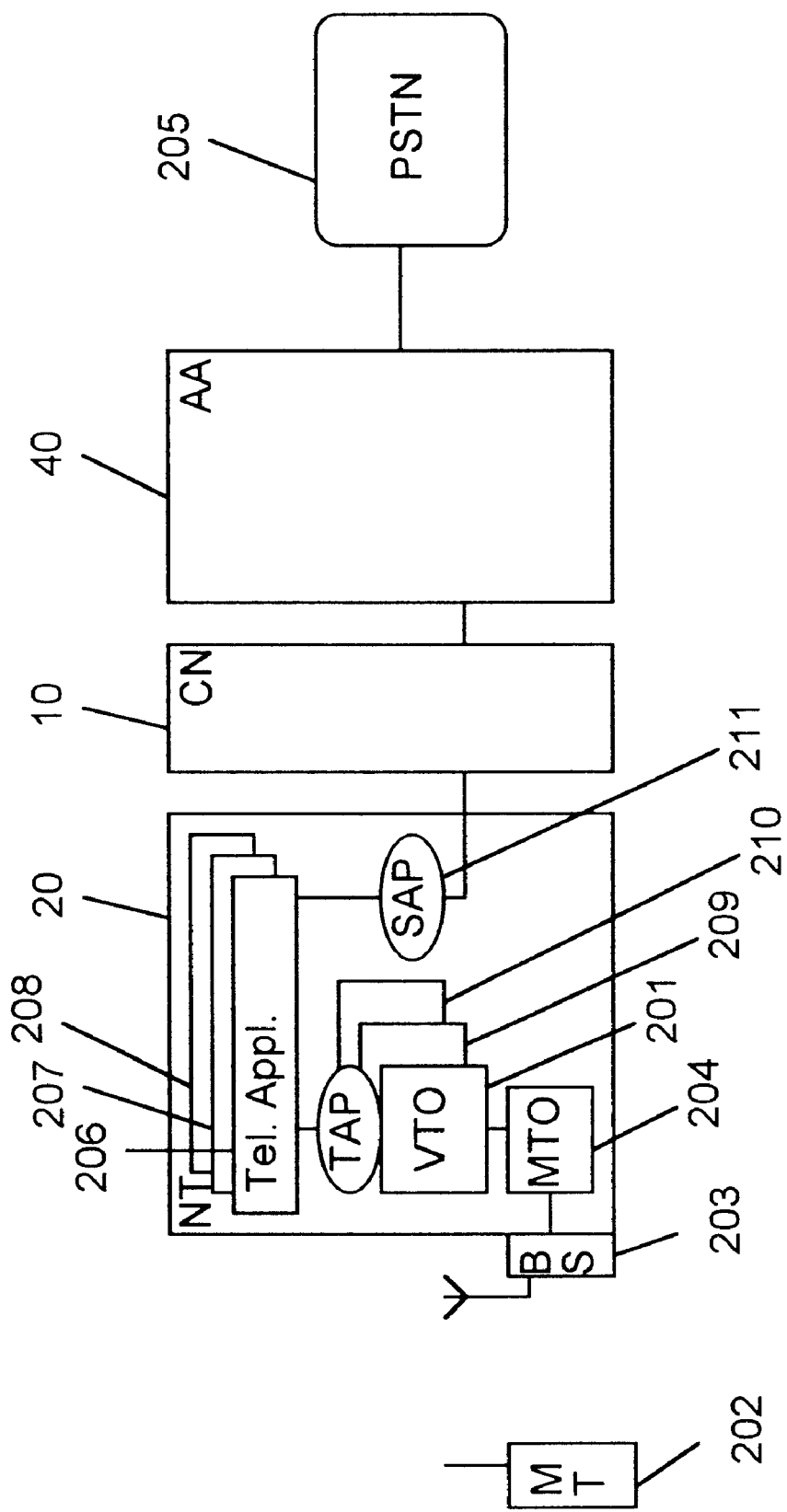
FIG. 9 illustrates an access system where PSTN is reached by a mobile telephone.

The first example considers an outgoing call from a physical mobile telephone to a PSTN network. Referring to FIG. 9, we have a virtual telephone 201, which is realized by a mobile phone 202, which can communicate with a base station 203, which is one of the interfaces of the network terminal 20, where a representation of the mobile telephone 204 terminates its access protocol. At the other side of the system, an access adapter 40 is connected to a PSTN network 205. The mobile phone 202 communicates with a mobile phone object 204 in the network terminal 20, using the standard radio access protocol. When the physical terminal 202 is activated, the mobile phone object 204 in the network terminal 20 is informed.

The network terminal 20 has been configured in advance to permit that the mobile phone 202 is used for calls to and from the PSTN 205. For each application 206–208, which can use the mobile phone 202 as a terminal, there may be a virtual terminal 201, 209, 210. The virtual terminals 201, 209, 210 are thus application specific.

When a call request is made from the mobile phone 202, the first problem is to select which service provider should get the opportunity to serve. (It is assumed that in this case the telephony application 206 is automatically selected when a session from this mobile phone 202 is initiated. Otherwise, selection of application 206–208 is the first step.) The first character in the given address may be a service provider selector. The first character has to be analysed, and as a result an external service provider is identified. The first Gatekeeper can then give the internal address (i.e. the address belonging to the address space of the connectivity network) of the corresponding access adapter.

In advance, a signal path has been established between the network terminal 20 and access adapter 40 of the selected service provider as part of the relation between this user and this specific service provider. This signal path can be used to request dedicated signaling paths for a specific session. A signaling relation is established between the telephony application 206 in the network terminal 20 and the access adapter 40 as described elsewhere. This may include a request to the connectivity network for a dedicated connection. A stream transfer relation (connection) is also established (which may include a request to the connectivity network for another connection), comprising of a 64 kb/s source, and a 64 kb/s sink, both encoded according to e.g. A-law. The signalling relation and the two-way stream transfer relation corresponds to the service access point 211.

Now, the telephony application 206 can send a SETUP message to the access adapter 40, which sends an appropriate message towards the PSTN 205. Assume that the return message is that the wanted destination was available and free, and that alerting has started. The access adapter will send the message ALERTING to the telephony application 206, which sends ALERTING to the virtual phone object 201, which in its turn sends ALERTING to the mobile phone object 204. The mobile phone object 204 sends the corresponding signal to the phone 202, which gives an indication on the display. (If the terminal were an analogue phone, a tone would have been sent from the network terminal 20).

When the called destination answers, an indication is received from the PSTN/ISDN 205. The access adapter sends CONNECT to the telephony application 206, which sends CONNECT to the virtual telephone object 201 including an order to establish the speech connection with the actual SAP, which virtual telephone object 201 sends CONNECT to the mobile telephone object 204 together with the request to establish the speech connection. The mobile telephone object 204 observes that the speech coding of the mobile telephone 202 does not fit to the 64 kb/s A-law encoding. In this case, a code transformer between A-law and GSM encoding is included. The mobile telephone object 204 will then send CONNECT to the mobile phone 202.

EXAMPLE 2

Figure 10:
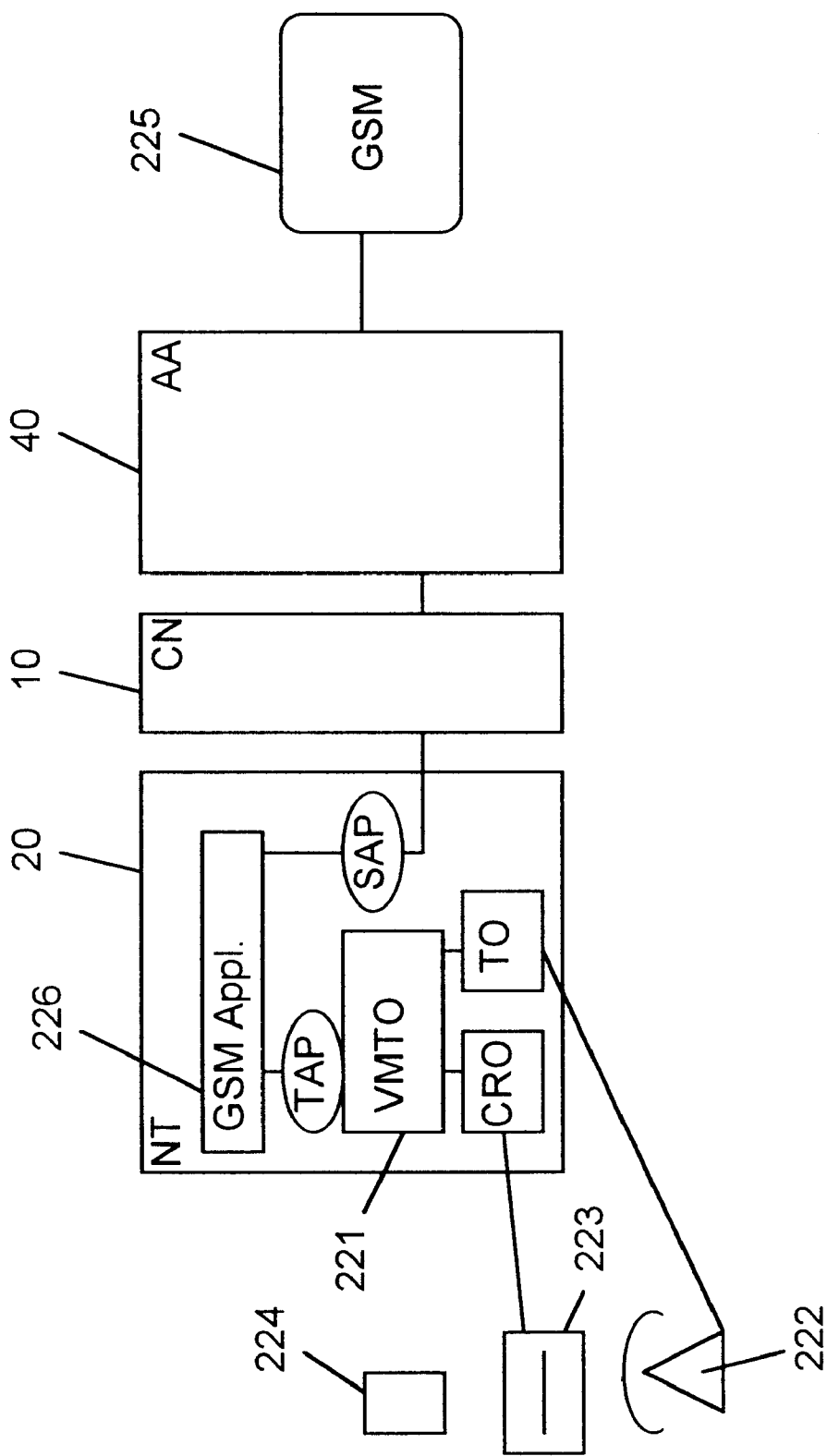
FIG. 10 illustrates an access system where A GSM network is reached by an analogue telephone and a card reader.

The second example considers an outgoing call from an analogue phone to a GSM network, as illustrated in FIG. 10. The virtual phone in this example is a virtual mobile telephone 221, which is realized by an analogue phone 222 and a card reader 223. The card reader may be connected over e.g. a LAN, but the analogue telephone is connected over a traditional dedicated wired interface. The card reader 223 has to be equipped with a valid SIM card 224 in order to make the virtual telephone workable. A GSM network 225 is connected through an access adapter 40.

The virtual mobile phone object 221 is activated when someone puts a SIM card 224 into the card reader 223, which informs the virtual mobile telephone 221. Then, a message PRESENT is sent to the GSM network 225 via the GSM telephony application 226. When a card is taken, an ABSENT message is sent to the AA interfacing the GSM network 225.

For simplicity, it is assumed that there is a specific application for GSM telephony. However, there may as well be applications using servcies of all kinds of telephony networks.

When someone is using the analogue telephone phone 222, the first thing to do is to select application. This may be done with a sequence of digits, followed by #, which indicates mobile telephony. At the same time, the virtual terminal object 221, which is associated with this telephone 222 when combined this specific application 226, is pointed out. This is done in a SETUP message, which also includes the destination address. If a valid SIM card 224 is inserted in the card reader 223, the session can proceed. The SIM card 224 indicates the mobile network 205. A SETUP message is sent to the access adapter 40. The signaling is essentially the same in this case as in the previous example.

EXAMPLE 3

Figure 11:
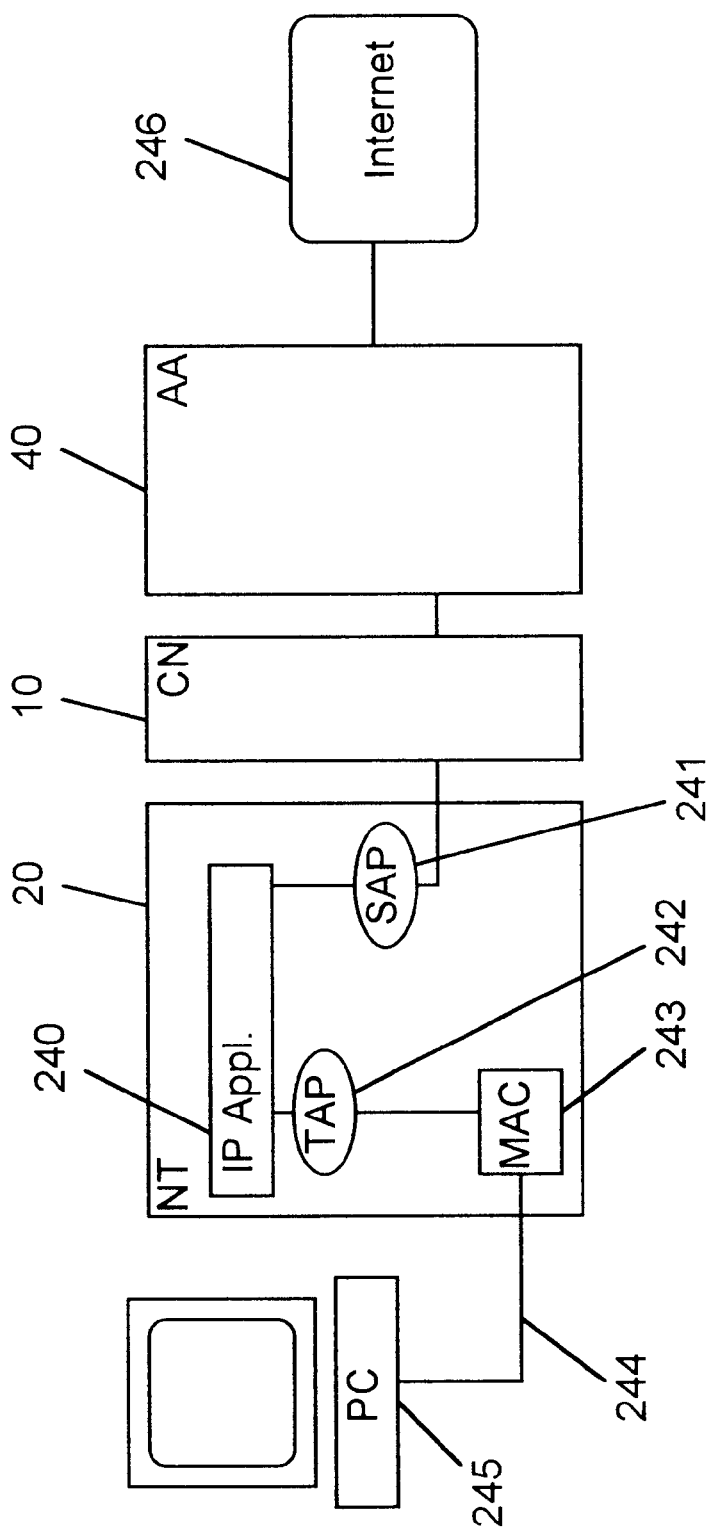
FIG. 11 illustrates an access system with a web browser access over internet.

The third example describes a web browser over Internet 246, referring to the FIG. 11. The PC 245 is connected to the NT 20 over a LAN 244, and the MAC protocol 243 of the LAN delivers an IP TAP 242, i.e. a TAP, which is visible as a sink and a source of IP packets. In this case, the virtual terminal is transparent—there is no need to make further abstractions of the IP TAP 242. The IP application 240 transfers the IP packets between a SAP 241 and a TAP 242. The remaining problem is selection of ISP for this session. This can be achieved e.g. by in advance configure the routing tables by a Web interface in such a way, that all packets from this origin is routed to a certain SAP 241, which may be always present in the network terminal.

EXAMPLE 4

Figure 12:
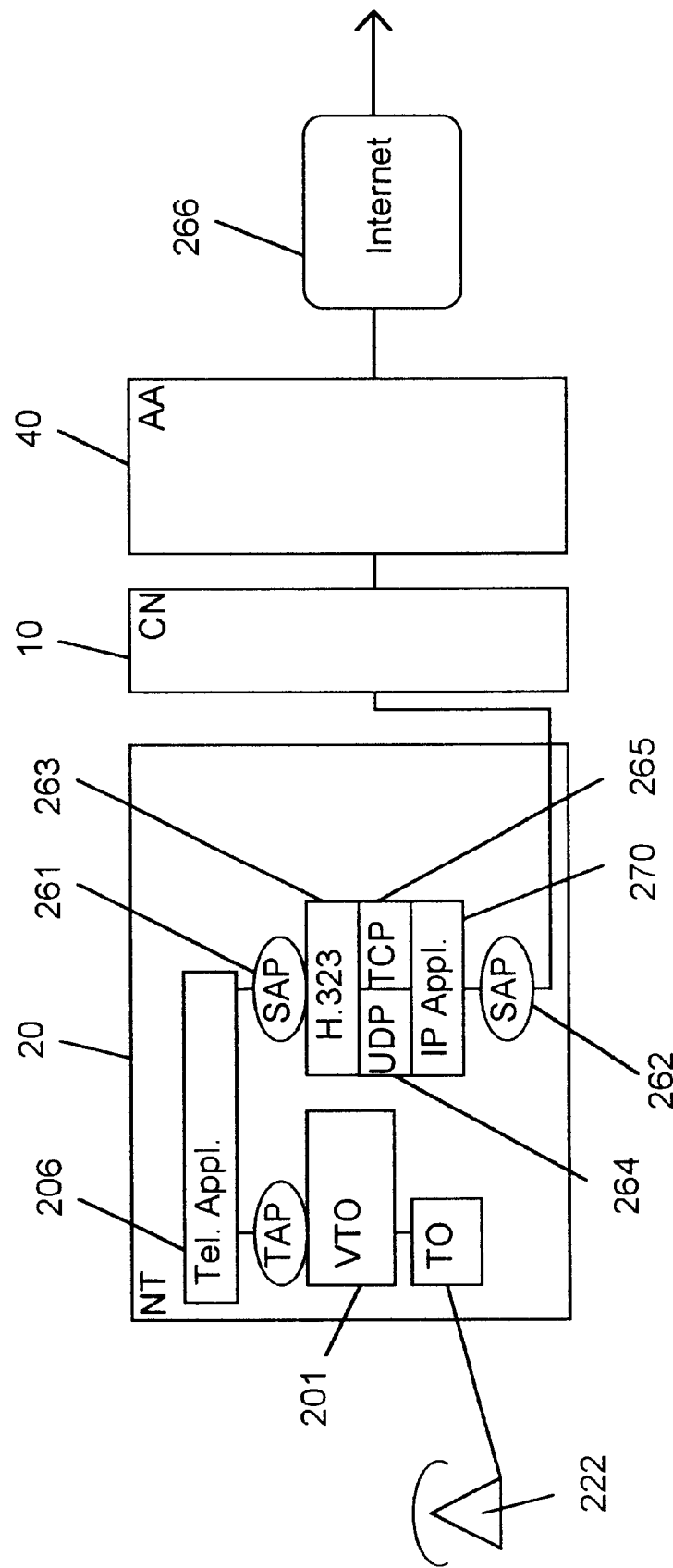
FIG. 12 illustrates an access system where an analogue telephone communicates by internet telephony.

The fourth example describes internet telephony from an analogue telephone. Internet telephony presupposes a telephony protocol over an IP network, using IP addresses. As shown in FIG. 12, an analogue telephone 222 is connected to the network terminal 20 and a virtual telephone object 201 is defined within the network terminal 20. An ordinary telephony application 206 handles the connection of the TAP of the virtual telephone object 201. A SAP 262 of an Internet network 266 is distributed to the network terminal 20. An IP application 270 uses the Internet SAP 262 to collect the IP packets. The IP application is configured to recognize that this is Internet telephony, which should be handed over to the telephony application 206. In this example it is supposed that H.323 protocol 263 is used. This protocol can run on top of TCP 265 and UDP 264 (control messages over TCP, and speech streams over UDP). A telephony SAP 261 is thus provided on top of an H.323 entity 263, which handles telephony control primitives and 64 kb/s speech streams (e.g. A-law encoded). If control primitive mapping or stream conversion is required, this is performed by the H.323 entity 263. In this way, telephony over IP is almost the same as other types of telephony sessions from the telephony application 206 viewpoint. The main difference is the type of address.

EXAMPLE 5

This fifth example is included in order to demonstrate the flexibility of the concept, not necessarily because it is a likely configuration.

Figure 13:
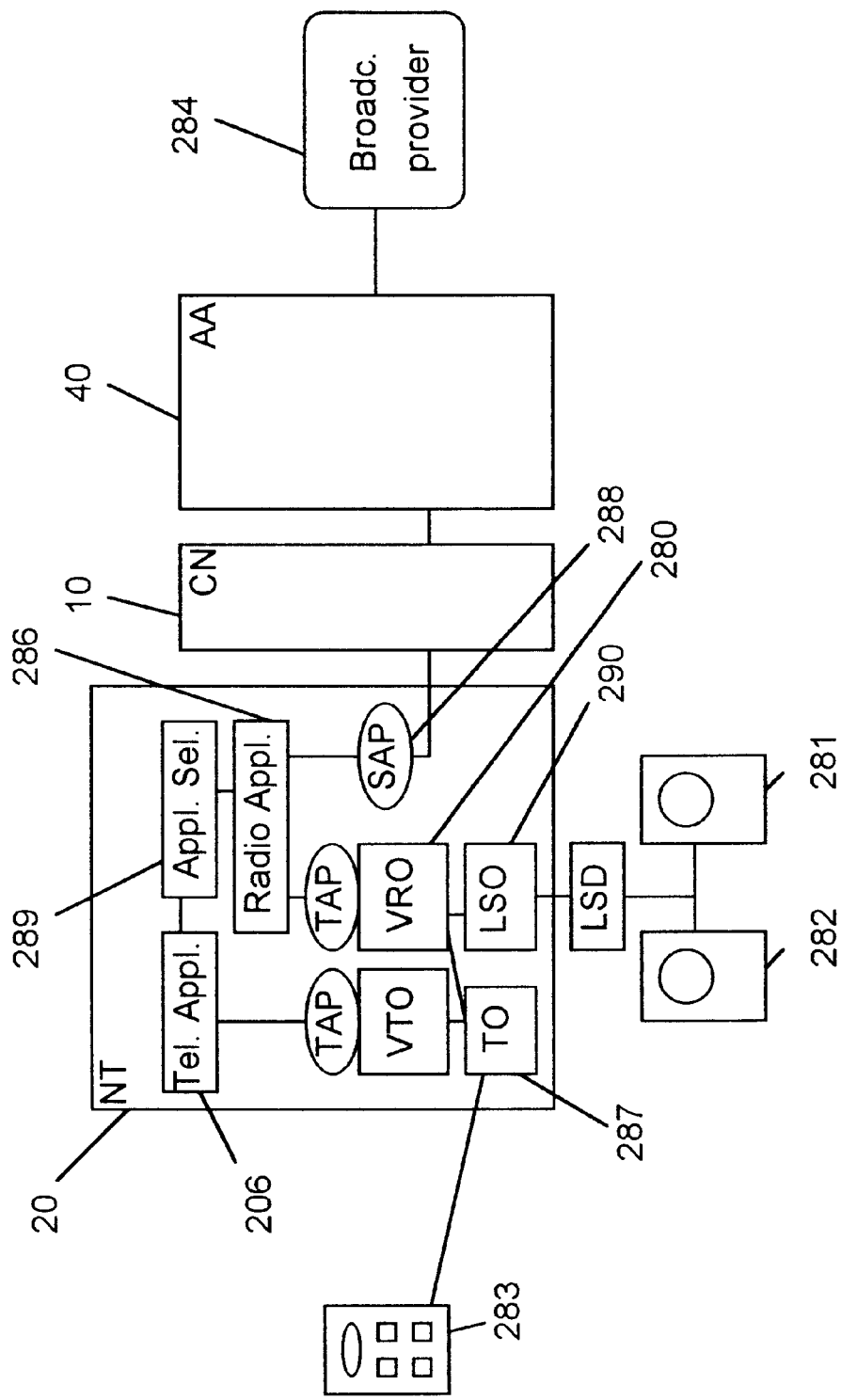
FIG. 13 illustrates an access system which allows for the transmission of radio programs to a pair of loudspeakers.

In the fifth example, the provision of radio programs to a loudspeaker connected to a home LAN is considered, as shown in FIG. 13. The virtual radio 280 is composed of a loudspeaker system, represented as two 15 kHz audio sinks 281 and 282 and a keypad telephone 283 as a control device for channel selection. We assume that there is an access adapter 40 connected to a TV distribution center 284. A set of TV channels are available, as well as a set of radio channels. Any channel can be selected by the means of a control protocol.

In order to use a telephone 283 as a control device for a radio application 286, a relation has to be established between the telephone 283 and that application 286. After lifting the handset, the radio application 286 has to be selected by the telephone 283, which is first communicating with a telephony application 206. The application selector 289 may be activated from the telephony application 206, since it is likely that in most cases a user want to use the telephone 283 for telephony, and we assume that the telephony application 206 is the default application of the telephone 283. The radio application 286 is selected e.g. by a code, followed by #. The virtual radio 280 is implied by the used control device 283. Then, channels may be selected by a number, followed by #. The radio application 286 requests a bi-directional signaling channel to the CATV headend 284, and a un-idirectional connection, which transfers the streams associated with the selected channel from the access adapter 40 to the network terminal 20. The radio application 286 then informs the virtual radio object 280 about the incoming streams, and the virtual radio object 280 orders the loudspeaker object 290 to connect to the audio stream sources. Adaptations of the audio streams to the stream requirement of the loudspeakers 281, 282 (e.g. changing of representation or transformation to a single stream) are controlled by the loudspeaker object 290.

The session ends when the handset of the telephone is placed on hook.

In the above description, a network terminal is described as one unit. However, as is understood by someone skilled in the art, a network terminal should be understood as a functional unit. Thus, a network terminal can comprise one as well as several physical units, and several network terminals or parts thereof may be comprised in one physical unit. One and the same network terminal may therefore be implemented as a number of physical units.

In a similar manner, the access adapter "unit", should also be regarded as a functional unit, rather than a physical one. It is therefore obvious for someone skilled in the art that several access adapters may be hosted in one and the same physical unit, as well as one access adapter may comprise parts physically distributed into several physical units. One physical unit, handling the access adapter functionality for several service providing networks, may therefore be considered as several access adapters comprised in one physical unit.

The general merits of the invention is that it provides a framework for access to all types of communication networks solutions, taking into account the manifold of transmission technologies, and connectivity technologies that can be of interest for access networks, as well as the manifold of terminals and home LAN solutions, as well as the heterogeneity of available networks. This provides the users with a very good flexibility and make equal access solutions possible.

It should be noted that even if the most of the examples relates to traditional telecommunication, the present invention is applicable in related communication fields and comprises general telecommunication, data communication, video and multimedia information as well as TV and radio broadcasting.

What is claimed is:

1. An access system for access to communication services, including telecommunication, data communication, and distribution of TV and radio transmissions, the access system comprising:
    a number of service providing networks providing a plurality of communication services;
    a number of physical terminals, said physical terminals including communication devices with capabilities for handling data streams and/or control signaling;
    a connectivity network that transports information in a transparent manner between the number of service providing networks and physical terminals;
    a network terminal connected between said physical terminals and said connectivity network; and
    a number of access adapters each connected between a respective service providing network and said connectivity network, said access adapters and said network terminal requesting services of said connectivity network, each access adapter including
        terminating means for terminating of service protocols of the services provided by the respective service providing networks, for extracting service providing network service primitives, and for forming a set of service access points, at which said service providing network service primitives are available, and
        first connectivity network adaptation means for adapting said selected set of service primitives to the transport service of the connectivity network and for transport of said selected set of service primitives transparently over said connectivity network to/from the network terminal;
    wherein the network terminal includes
        second connectivity network adaptation means which extracts the transported service primitives and offers them to a distributed service access point in the network terminal, and
        a number of applications that use service primitives of the service access points and offer them at a set of terminal access points at which said communication devices with suitable capabilities are connected to the network terminal to provide each of the physical terminals with access to each of the plurality of communication services from any of the service providing networks.

2. The access system according to claim 1, wherein said access adapter comprises service adaptation means for mapping of said service providing network service primitives on a suitable selected set of service primitives of the connectivity network.

3. The access system according to claim 1, wherein said first communication adaptation means comprises means for segmentation/desegmentation, for rate adaptation and/or for synchronisation so as to adapt to the required format of the carried information in the connectivity network and the delivered quality of service.

4. The access system according to claim 1, wherein connectivity network has a transmission capability with a suitable quality set by the requirements of the service to be accessed from the network terminal.

5. The access system according to claim 4, wherein said second access network adaptation means comprises means for segmentation/desegmentation, for rate adaptation and/or for synchronisation so as to adapt to the required format of the carried information in the connectivity network and the delivered quality of service.

6. The access system according to claim 1, wherein said network terminal is configured to use a selected set of services from a selected set of service providing networks.

7. The access system according to claim 1, wherein the system comprises additional network terminals.

8. The access system according to claim 7, wherein said applications provide selection of service providing networks.

9. The access system according to claim 8, wherein said applications provide services to users by using and enhancing services provided by a set of service providing networks.

10. The access system according to claim 8, wherein a subset of said applications use services of other applications in said network terminal.

11. The access system according to claim 8, wherein a subset of said applications use service primitives of terminals connected to said network terminal.

12. The access system according to claim 8, wherein said applications use interactive and/or distributive services.

13. The access system according to claim 8, wherein said applications use isochronous and/or asynchronous services.

14. The access system according to claim 7, wherein said applications use telephony, IP, multimedia, TV distribution and/or video on demand.

15. The access system according claim 7, wherein said applications use any communication service delivered as an application over any accessed communication service.

16. The access system according to claim 1, wherein first gatekeeper means for associating public addresses of said service providing networks with internal addresses within said access system, in order to support mapping in network terminals and/or access adapters between public addresses and internal addresses.

17. The access system according to claim 16, wherein said first gatekeeper means is accessible over said connectivity network.

18. The access system according to claim 16, wherein said first gatekeeper means is distributed.

19. The access system according to claim 1, wherein said connectivity network comprises a network which is circuit switched or packet oriented.

20. The access system according to claim 19, wherein the connectivity network can transport information between selected network terminals and selected access adapters and that it, at each selected network terminal and each selected access adapter, simultaneously can maintain several sessions with several destinations.

21. The access system according to claim 20, wherein the need of the connectivity network to move information over distances is accomplished by links which are provided by one or more transmission networks, a link transporting information point-to-point or point-to-multi point.

22. The access system according to claim 21, wherein said connectivity network is selected from the group consisting of an ATM network, an IP network, a frame relay network, a mobile telecommunication system which supports many simultaneous sessions from any terminal.

23. The access system according to claim 22, wherein the connectivity network comprises a radio based network, terrestrial or satellite.

24. The access system according to claim 23, wherein the connectivity network comprises a radio based network supporting mobility of the network terminal within the area covered by the radio based connectivity network.

25. The access system according to claim 24, wherein said radio based network provides mobility of the network terminal within the complete area covered by a base station of said radio based network on a per session basis.

26. The access system according to claim 24, wherein said radio based network supports hand over functionality so as to provide mobility of the network terminal within contiguous areas covered by different base stations without terminating an ongoing session.

27. The access system according to claim 19, wherein said connectivity network is using links provided by any set of suitable transmission techniques and any set of suitable media.

28. The access system according to claim 27, wherein said transmission technique and medium can be different from one link to another.

29. The access system according to claim 27, wherein a link is provided by a combination of many transmission techniques.

30. The access system according to claim 1, wherein a link is provided by a radio based network, terrestrial or satellite, and that said link is terminated at a network terminal.

31. The access system according to claim 1, wherein said radio based network supports mobility of the network terminal within the area covered by the radio based link.

32. The access system according to claim 1, wherein said radio based network provides mobility of the network terminal within the complete area covered by a base station of said radio based network on a per session basis.

33. The access system according to claim 1, wherein said radio based network supports hand over functionality so as to provide mobility of the network terminal within contiguous areas covered by different base station without terminating an ongoing session.

34. The access system according to claim 1, wherein said application means in said network terminal provides for selection of said services and of said service providing networks at a per session basis.

35. The access system according to claim 1, wherein said terminals are connected to a network terminal over a dedicated medium or over a shared medium.

36. The access system according to claim 35, wherein said terminals are connected to a network terminal over a LAN, Ethernet, optical fibre, copper wire, coaxial cable, IR or radio.

37. The access system according to claim 1, wherein said terminals are connected to a network terminal over a wired connection or a wireless connection.

38. The access system according to claim 37, wherein a terminal is accessed from the network terminal over a link provided by a second connectivity network on the terminal side of the network terminal, said link providing a point to point connection.

39. The access system according to claim 1, wherein an protocol of a service providing network is bridged over the access system to an entity connected to said network terminal, whereby said protocol is not terminated in said access system but the entities of said protocol are conveyed transparently over said access system.

40. The access system according to claim 39, wherein said protocol is an access protocol or an internal protocol of said service providing network.

41. The access system according to claim 40, wherein said entity connected to said network terminal is a PABX and that said protocol is a PABX access protocol.

42. The access system according to claim 40, wherein said entity connected to said network terminal is a PSTN/ISDN access network and that said protocol is a V5.2 access protocol.

43. The access system according to claim 40, wherein said entity connected to said network terminal is a base radio station of a mobile network and that said protocol is an internal mobile protocol connecting base radio stations.

44. A network terminal for providing access to a plurality of communication services, including telecommunication, data communication, and distribution of TV and radio transmission, the network terminal comprising:

- a plurality of physical interfaces coupling a plurality of physical terminals to a connectivity network, the connectivity network transporting information in a transparent manner between the physical terminals and a plurality of service providing networks providing a plurality of communication services, at least one of said physical interfaces having access to service access points of the connectivity network, wherein said plurality of physical interfaces include a physical interface that carries a plurality of link protocols to a plurality of connectivity networks so as to make services of the plurality of connectivity networks available to the network terminals;
- an application infrastructure in including processor means with an operating system, a plurality of applications, and memory means; and
- a communication infrastructure connecting the physical interfaces to the application infrastructure, and connecting the connectivity network to the application infrastructure, said communication infrastructure comprising:
  - a plurality of protocol stacks; and
  - address mapping means functionally integrated with the protocol stacks, said stacks and mapping means providing communication between the physical terminals and the applications, between the connectivity network and the applications, for intercommunication between the applications, and for intercommunication between the physical terminals, wherein said physical interface having access to service access points of the connectivity network provides each of the physical terminals with access to each of the plurality of communication services from any of the service providing networks.

45. A network terminal for providing access to a plurality of communication services, including telecommunication, data communication, and distribution of TV and radio transmission, the network terminal comprising:

- a plurality of physical interfaces coupling a plurality of physical terminals to a connectivity network the connectivity network transporting information in a transparent manner between the physical terminals and a plurality of service providing networks providing a plurality of communication services, at least one of said physical interfaces having access to service access points of the connectivity network, wherein said plurality of physical interfaces include several physical interfaces, each of which connects to a different connectivity network, so as to make services of several connectivity networks available to the network terminal;
- an application infrastructure including processor means with an operating system, a plurality of applications, and memory means; and
- a communication infrastructure connecting the physical interfaces to the application infrastructure, and connecting the connectivity network to the application infrastructure, said communication infrastructure comprising:
  - a plurality of protocol stacks; and
  - address mapping means functionally integrated with the protocol stacks, said stacks and mapping means providing communication between the physical terminals and the applications, between the connectivity network and the applications, for intercommunication between the applications, and for intercommunication between the physical terminals, wherein said physical interface having access to service access points of the connectivity network provides each of the physical terminals with access to each of the plurality of communication services from any of the service providing networks.

46. The network terminal according to claim 45, wherein the several physical interfaces each include a respective link protocol to one connectivity network common to the several physical interfaces or to a respective connectivity network.

47. A network terminal for providing access to a plurality of communication services, including telecommunication, data communication, and distribution of TV and radio transmission, the network terminal comprising:

- a plurality of physical interfaces coupling a plurality of physical terminals to a connectivity network, the connectivity network transporting information in a transparent manner between the physical terminals and a plurality of service providing networks providing a plurality of communication services, at least one of said physical interfaces having access to service access points of the connectivity network;
- an application infrastructure including processor means with an operating system, a plurality of applications, and memory means, wherein the applications include communication applications in the form of software stored in said memory means and/or in the form of hardware means; and
- a communication infrastructure connecting the physical interfaces to the application infrastructure, and connecting the connectivity network to the application infrastructure, said communication infrastructure comprising:
  - a plurality of protocol stacks; and
  - address mapping means functionally integrated with the protocol stacks, said stacks and mapping means providing communication between the physical terminals and the applications, between the connectivity network and the applications, for intercommunication between the applications, and for intercommunication between the physical terminals, wherein said physical interface having access to service access points of the connectivity network provides each of the physical terminals with access to each of the plurality of communication services from any of the service providing networks.

48. The network terminal according to claim 47, further comprising boot means for negotiation with a configuration server in the connectivity network to which the terminal is connected, said boot means exchanging with the configuration server, address information sufficient for handling each one of the network terminal's accesses to service providing networks connected to said connectivity network over access adapters.

49. The network terminal according to claim 48, wherein said boot means exchanges the address information after removing the network terminal from the connectivity network and subsequently reinserting it.

50. The network terminal according to claim 49, wherein said boot means includes means for exchanging the address information when the network terminal is reinserted at a different site in said connectivity network as compared to the one from which the network terminal was removed, thus imparting mobility to said network terminal.

\* \* \* \* \*